United States Patent
Hara et al.

(10) Patent No.: US 11,648,626 B2
(45) Date of Patent: May 16, 2023

(54) LASER-WELDED LAP JOINT, METHOD FOR PRODUCING LASER-WELDED LAP JOINT, AND AUTOMOBILE FRAME COMPONENT

(71) Applicant: JFE Steel Corporation, Tokyo (JP)

(72) Inventors: Asato Hara, Tokyo (JP); Yasushi Kitani, Tokyo (JP)

(73) Assignee: JFE Steel Corporation, Tokyo (JP)

(*) Notice: Subject to any disclaimer, the term of this patent is extended or adjusted under 35 U.S.C. 154(b) by 403 days.

(21) Appl. No.: 17/055,739

(22) PCT Filed: May 20, 2019

(86) PCT No.: PCT/JP2019/019837
§ 371 (c)(1),
(2) Date: Nov. 16, 2020

(87) PCT Pub. No.: WO2019/225527
PCT Pub. Date: Nov. 28, 2019

(65) Prior Publication Data
US 2021/0205925 A1 Jul. 8, 2021

(30) Foreign Application Priority Data
May 21, 2018 (JP) .............................. JP2018-096825

(51) Int. Cl.
*B23K 26/244* (2014.01)
*C22C 38/00* (2006.01)
(Continued)

(52) U.S. Cl.
CPC .......... *B23K 26/244* (2015.10); *C22C 38/002* (2013.01); *C22C 38/02* (2013.01);
(Continued)

(58) Field of Classification Search
CPC .............. B23K 26/244; B23K 2101/18; B23K 2103/04; B23K 2101/006; C22C 38/002;
(Continued)

(56) References Cited

U.S. PATENT DOCUMENTS

| 2004/0182836 A1 | 9/2004 | Becker et al. |
| 2005/0211680 A1 | 9/2005 | Li et al. |

(Continued)

FOREIGN PATENT DOCUMENTS

| CN | 103447686 A | 12/2013 |
| CN | 104107980 A | 10/2014 |

(Continued)

OTHER PUBLICATIONS

Korean Grant of Patent for Korean Application No. 10-2020-7033333, dated Mar. 4, 2022 with translation, 4 pages.

(Continued)

*Primary Examiner* — John J Norton
*Assistant Examiner* — Simpson A Chen
(74) *Attorney, Agent, or Firm* — RatnerPrestia (57) ABSTRACT

The present invention includes a laser-welded lap joint including a weld zone formed by laser lap welding in a lapped portion including a plurality of lapped steel sheets. The weld zone includes a main weld zone that penetrates the steel sheets in the lapped portion and a final weld zone formed at one end of the main weld zone and having a crater, and the weld zone satisfies formulas (1) to (4):

$$L \geq 15.0; \qquad (1)$$

$$10.0 \geq L2 \geq 2l_c; \qquad (2)$$

$$t1 \geq 2d_c; \qquad (3)$$

(Continued)

(A)

(B)

$w_c > d_c$ (4).

18 Claims, 4 Drawing Sheets

(51) Int. Cl.
| | |
|---|---|
| *C22C 38/02* | (2006.01) |
| *C22C 38/06* | (2006.01) |
| *C22C 38/22* | (2006.01) |
| *C22C 38/26* | (2006.01) |
| *C22C 38/28* | (2006.01) |
| *C22C 38/32* | (2006.01) |
| *C22C 38/38* | (2006.01) |
| *B23K 101/18* | (2006.01) |
| *B23K 103/04* | (2006.01) |
| *B23K 101/00* | (2006.01) |

(52) U.S. Cl.
CPC .............. *C22C 38/06* (2013.01); *C22C 38/22* (2013.01); *C22C 38/26* (2013.01); *C22C 38/28* (2013.01); *C22C 38/32* (2013.01); *C22C 38/38* (2013.01); *B23K 2101/006* (2018.08); *B23K 2101/18* (2018.08); *B23K 2103/04* (2018.08)

(58) Field of Classification Search
CPC ......... C22C 38/02; C22C 38/06; C22C 38/22; C22C 38/26; C22C 38/28; C22C 38/32; C22C 38/38
See application file for complete search history.

(56) References Cited

U.S. PATENT DOCUMENTS

| | | | | |
|---|---|---|---|---|
| 2010/0230390 A1* | 9/2010 | Nishio | ............... | B23K 26/0869 219/121.64 |
| 2012/0211474 A1* | 8/2012 | Hayashimoto | ..... | B23K 26/0665 219/121.64 |
| 2017/0306524 A1 | 10/2017 | Bennett et al. | | |

FOREIGN PATENT DOCUMENTS

| | | |
|---|---|---|
| EP | 2143519 A1 | 1/2010 |
| JP | 2001198688 A | 7/2001 |
| JP | 2007229740 A | 9/2007 |
| JP | 2008296236 A | 12/2008 |
| JP | 2009255134 A | 11/2009 |
| JP | 2012080020 A | 4/2012 |
| JP | 2012170989 A | 9/2012 |
| JP | 2012240083 A | 12/2012 |
| JP | 2012240086 A | 12/2012 |
| JP | 2013215755 A | 10/2013 |
| JP | 2017113781 A | 6/2017 |
| WO | 2018003341 A1 | 1/2018 |

OTHER PUBLICATIONS

International Search Report and Written Opinion for International Application No. PCT/JP2019/019837, dated Jul. 16, 2019, 4 pages.
Japanese Grant of Patent for Japanese Application No. 10-2020-7033333, dated Mar. 4, 2022 with translation, 4 pages.
Extended European Search Report for European Application No. 19 808 427.9, dated Oct. 11, 2021, 7 pages.
Chinese Office Action for Chinese Application No. 201980032610.0, dated Dec. 1, 2021 with Concise Statement of Relevance of Office Action, 9 pages.

* cited by examiner

FIG. 8

LASER-WELDED LAP JOINT, METHOD FOR PRODUCING LASER-WELDED LAP JOINT, AND AUTOMOBILE FRAME COMPONENT

CROSS REFERENCE TO RELATED APPLICATIONS

This is the U.S. National Phase application of PCT/JP2019/019837, filed May 20, 2019, which claims priority to Japanese Patent Application No. 2018-096825, filed May 21, 2018, the disclosures of these applications being incorporated herein by reference in their entireties for all purposes.

FIELD OF THE INVENTION

The present invention relates to a laser-welded lap joint, to a method for producing the laser-welded lap joint, and an automobile frame component including the laser-welded lap joint.

BACKGROUND OF THE INVENTION

Resistance spot welding has conventionally been used for welding of automobile structural members having flange portions. However, resistance spot welding has the following problems: the welding is time consuming; a pitch cannot be reduced because the amount of heat generated decreases due to shunt current; and there are spatial limitations due to a gun of the welder. In recent years, to solve these problems, it has been contemplated to use laser lap welding in addition to the conventional resistance spot welding. The laser lap welding is a welding method in which a surface of a plurality of lapped steel sheets is irradiated with a laser beam to join the steel sheets together.

In the laser lap welding, a surface of a plurality of lapped steel sheets is irradiated linearly with a laser beam. The irradiated portion of the steel sheets irradiated with the laser beam is fused and solidified, and a fusion zone (weld zone) is thereby formed. In this manner, the lapped steel sheets are joined together, and a laser-welded lap joint can be obtained. However, one problem with the laser lap welding is that cracking is likely to occur at the terminal end side of the linear fusion zone. Once a crack occurs, the crack propagates over the entire length of the fusion zone. It is feared that the propagation of the crack formed in the weld metal may cause a reduction in static strength such as shear strength and peeling strength of the laser-welded lap joint portion and also a significant reduction in fatigue strength due to propagation of cracks from the initial crack. In recent years, high-tensile steel sheets with increased strength are being used for automobile body components, particularly frame components, in order to improve the strength and stiffness of automobile bodies, and a reduction in static strength and fatigue strength of joints due to cracks in weld zones is a serious problem.

Accordingly, various techniques have been disclosed as methods for preventing the occurrence and propagation of cracks in laser lap weld zones that are formed when lapped steel sheets are laser-welded.

For example, Patent Literature 1 discloses a technique for preventing weld cracking by disposing a lower steel sheet to be lap-welded so as to protrude and setting a welding start position to be spaced apart from an edge of a flange. Patent Literature 2 discloses a technique for preventing weld cracking by irradiating an edge portion of lapped surfaces with a laser beam obliquely. Patent Literature 3 and Patent Literature 4 disclose techniques for preventing weld cracking by reheating or welding an already welded portion or a peripheral portion of the welded portion. Patent Literature 5 discloses a technique for preventing the occurrence of weld cracking by welding lapped surfaces elliptically.

PATENT LITERATURE

PTL 1: Japanese Unexamined Patent Application Publication No. 2007-229740
PTL 2: Japanese Unexamined Patent Application Publication No. 2008-296236
PTL 3: Japanese Unexamined Patent Application Publication No. 2012-240083
PTL 4: Japanese Unexamined Patent Application Publication No. 2012-240086
PTL 5: Japanese Unexamined Patent Application Publication No. 2017-113781

SUMMARY OF THE INVENTION

However, in the method described in Patent Literature 1, since the lower steel sheet to be lap-welded is disposed so as to protrude, the protruding portion is redundant, and the design of components is disadvantageously restricted.

In the method described in Patent Literature 2, the laser beam is applied obliquely. When a gap is present between lapped sheets, a fusion zone is not well formed on the lapped surfaces, and this results in incomplete penetration. Therefore, disadvantageously, it is difficult to obtain sufficient strength.

In the methods described in Patent Literature 3 and Patent Literature 4, an already welded portion or a peripheral portion of the welded portion is reheated or welded. Therefore, disadvantageously, additional welding time for reheating or welding is required.

In the method described in Patent Literature 5, lapped surfaces are welded elliptically. Therefore, the method is not applicable to weld cracking in linear weld zones.

Aspects of the present invention have been made in view of the foregoing problems, and it is an object to provide a laser-welded lap joint in which the occurrence of a crack in a terminal end portion of a fusion zone and the propagation of the crack can be prevented and which has good peeling strength and to provide a method for producing the laser-welded lap joint and an automobile frame component including the laser-welded lap joint.

The present inventors have conducted studies to solve the foregoing problems and obtained the following findings.

In accordance with aspects of the present invention, attention is given to (a) the full length of a fusion zone, (b) the length of a final weld zone, (c) the length, depth, and width of a crater in a terminal end portion of the laser lap weld zone, and (d) the thickness of the uppermost steel sheet of a plurality of lapped steel sheets. The inventors have found that, by controlling all the relations of the above (a) to (d), i.e., by forming a weld zone satisfying formulas (1) to (4) below by laser lap welding, the occurrence of a crack on the terminal end side of the weld zone and the propagation of the crack can be prevented. In accordance with aspects of the present invention, a fusion zone and a heat-affected zone are collectively referred to as a weld zone.

$$L \geq 15.0 \tag{1}$$

$$10.0 \geq L2 \geq 2l_c \tag{2}$$

$$t1 \geq 2d_c \tag{3}$$

$$w_c > d_c \tag{4}$$

Here, L is the full length (unit: mm) of the weld zone, and L2 is the length (unit: mm) of the final weld zone. $l_c$ is the length (unit: mm) of the crater in the final weld zone, and t1 is the thickness (unit: mm) of the uppermost steel sheet in the lapped portion. $d_c$ is the depth (unit: mm) of the crater in the final weld zone, and $w_c$ is the width (unit: mm) of the crater in the final weld zone.

Moreover, the inventors have found that, by controlling the total thickness of the plurality of lapped steel sheets and the total size of gaps between the plurality of lapped steel sheets, stress concentration on the fusion zone on the lapped surfaces can be reduced and the peeling strength can be further improved.

Aspects of the present invention have been made based on the above findings and are summarized as follows.

[1] A laser-welded lap joint including a weld zone formed by laser lap welding in a lapped portion including a plurality of steel sheets lapped one over another, wherein the weld zone includes a main weld zone that penetrates the steel sheets in the lapped portion and a final weld zone formed at one end of the main weld zone and having a crater, and wherein the weld zone satisfies formulas (1) to (4):

$$L \geq 15.0; \tag{1}$$

$$10.0 \geq L2 \geq 2l_c; \tag{2}$$

$$t1 \geq 2d_c; \tag{3}$$

$$w_c > d_c, \tag{4}$$

where L is the full length (unit: mm) of the weld zone, L2 is the length (unit: mm) of the final weld zone, $l_c$ is the length (unit: mm) of the crater in the final weld zone, t1 is the thickness (unit: mm) of an uppermost steel sheet in the lapped portion, $d_c$ is the depth (unit: mm) of the crater in the final weld zone, and $w_c$ is the width (unit: mm) of the crater in the final weld zone.

[2] The laser-welded lap joint according to [1], wherein the total size of a gap between the steel sheets in the lapped portion is 0% or more and 15% or less of the total thickness of the plurality of steel sheets.

[3] The laser-welded lap joint according to [1] or [2], wherein at least one steel sheet of the plurality of steel sheets has a chemical composition containing, in mass %:
C: more than 0.07% and 0.25% or less;
P+S: less than 0.03%;
Mn: 1.8% or more and 3.0% or less; and
Si: more than 1.2% and 2.5% or less,
with the balance being Fe and unavoidable impurities.

[4] The laser-welded lap joint according to any one of [1] to [3], further containing, in addition to the chemical composition, one or two selected from the following groups A and B:
group A: in mass %, one or two selected from Ti: 0.005% or more and 0.01% or less and Nb: 0.005% or more and less than 0.050%, and
group B: in mass %, one or two or more selected from Cr: 1.0% or less, Mo: 0.50% or less, and B: 0.10% or less.

[5] The laser-welded lap joint according to any one of [1] to [4], wherein at least one steel sheet of the plurality of steel sheets is a high-tensile steel sheet with a tensile strength of 980 MPa or more.

[6] A method for producing the laser-welded lap joint according to any one of [1] to [5], the method including:
lapping the plurality of steel sheets vertically one over another; and
performing laser welding in which a surface of the uppermost steel sheet in the lapped portion including the plurality of lapped steel sheets is irradiated with a laser beam to form the weld zone in the lapped portion to thereby join the plurality of lapped steel sheets together.

[7] The method for producing the laser-welded lap joint according to [6], wherein the laser welding includes: a main welding step of forming the main weld zone; and a final welding step of forming the final weld zone having the crater, and wherein at least one of laser power, welding speed, a focal position, and a beam diameter in the final welding step is controlled under conditions in which formula (5) to (7) are satisfied such that the weld zone formed satisfies formulas (1) to (4):

$$L \geq 15.0; \tag{1}$$

$$10.0 \geq L2 \geq 2l_c; \tag{2}$$

$$t1 \geq 2d_c; \tag{3}$$

$$w_c > d_c, \tag{4}$$

$$P_i \geq P_f \geq (1/4)P_i; \tag{5}$$

$$v_i \geq v_f \geq (1/4)v_i; \tag{6}$$

$$f_i \leq f_f \leq 20.0, \tag{7}$$

where L is the full length (unit: mm) of the weld zone, L2 is the length (unit: mm) of the final weld zone, $l_c$ is the length (unit: mm) of the crater in the final weld zone, t1 is the thickness (unit: mm) of the uppermost steel sheet in the lapped portion, $d_c$ is the depth (unit: mm) of the crater in the final weld zone, $w_c$ is the width (unit: mm) of the crater in the final weld zone, $P_i$ is laser power (unit: kW) in the main welding step, $P_f$ is the laser power (unit: kW) in the final welding step, $v_i$ is welding speed (unit: m/min) in the main welding step, $f_f$ is the welding speed (unit: m/min) in the final welding step, $f_i$ is a focal position (unit: mm) in the main welding step, and $f_f$ is the focal position (unit: mm) in the final welding step.

[8] An automobile frame component including the laser-welded lap joint according to any one of [1] to [5].

According to aspects of the present invention, the occurrence and propagation of cracks in a terminal end portion of the weld zone formed by laser lap-welding the plurality of lapped steel sheets can be prevented. Therefore, the laser-welded lap joint produced can have good peeling strength. Since the laser-welded lap joint according to aspects of the present invention has excellent appearance, the laser-welded lap joint is preferable for structural components of automobiles, and an automobile frame component including the laser-welded lap joint according to aspects of the present invention can be produced.

DETAILED DESCRIPTION OF EMBODIMENTS OF THE INVENTION

The laser-welded lap joint according to aspects of the present invention, a method for producing the laser-welded lap joint, and an automobile frame component will be described with reference to the drawings. However, the present invention is not limited to the embodiments.

<Laser-Welded Lap Joint>

The laser-welded lap joint according to aspects of the present invention includes a weld zone formed by laser lap welding in a lapped portion including a plurality of lapped steel sheets. The weld zone includes a main weld zone penetrating the steel sheets in the lapped portion and a final weld zone formed at one end of the main weld zone and having a crater. The weld zone satisfies the following formulas (1) to (4):

$$L \geq 15.0; \quad (1)$$

$$10.0 \geq L2 \geq 2l_c; \quad (2)$$

$$t1 \geq 2d_c; \quad (3)$$

$$w_c > d_c. \quad (4)$$

Here, L is the full length (unit: mm) of the weld zone, L2 is the length (unit: mm) of the final weld zone, $l_c$ is the length (unit: mm) of the crater in the final weld zone, t1 is the thickness (unit: mm) of the uppermost steel sheet in the lapped portion, $d_c$ is the depth (unit: mm) of the crater in the final weld zone, and $w_c$ is the width (unit: mm) of the crater in the final weld zone.

Figure 1:
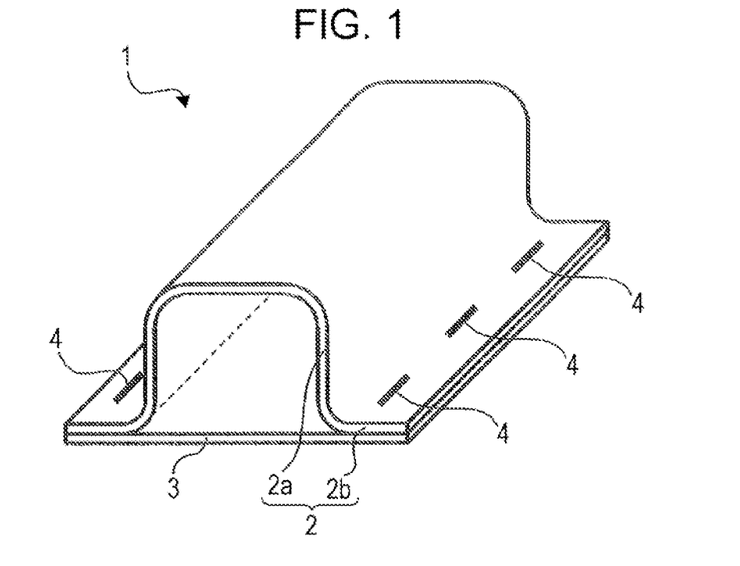
FIG. 1 is a perspective view showing an example of the laser-welded lap joint according to aspects of the present invention.
Figure 2:
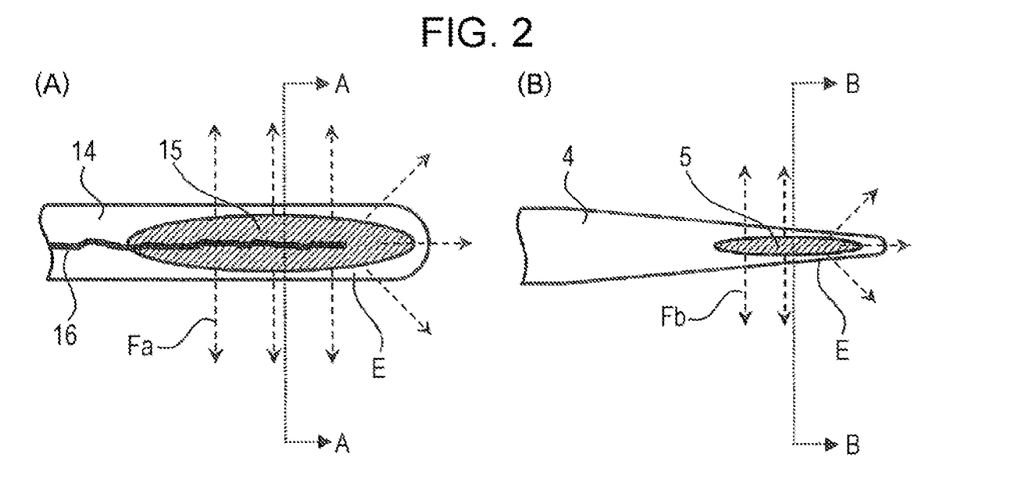
FIG. 2(A) is a schematic illustration showing a welding terminal end portion of a conventional laser-welded lap joint.
FIG. 2(B) is a schematic illustration showing a welding terminal end portion in the laser-welded lap joint according to aspects of the present invention.
Figure 3:
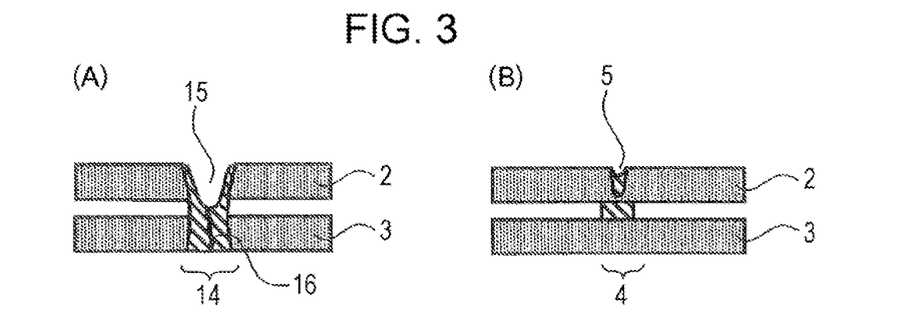
FIG. 3(A) is a cross-sectional view of the laser-welded lap joint in FIG. 2(A) taken along line A-A.
FIG. 3(B) is a cross-sectional view of the laser-welded lap joint in FIG. 2(B) taken along line B-B.
Figure 4:
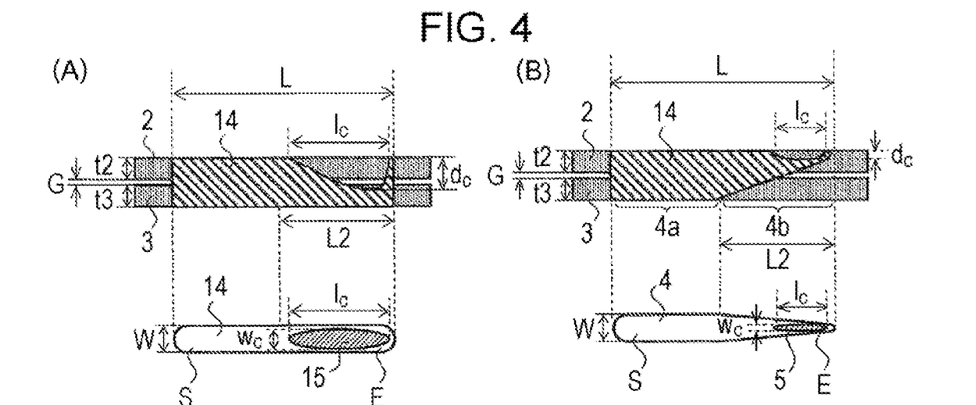
FIG. 4(A) shows a top view and a cross-sectional view illustrating a weld zone in the conventional laser-welded lap joint.
FIG. 4(B) shows a top view and a cross-sectional view illustrating a weld zone in the laser-welded lap joint according to aspects of the present invention.

An embodiment of the laser-welded lap joint 1 according to aspects of the present invention will be described using FIGS. 1 to 4. FIG. 1 is a perspective view showing an example of the laser-welded lap joint 1 according to aspects of the present invention. FIG. 2(A) is a schematic illustration showing a welding terminal end portion of a conventional laser-welded lap joint, and FIG. 2(B) is a schematic illustration showing a welding terminal end portion of the laser-welded lap joint according to aspects of the present invention. FIG. 3(A) is a cross-sectional view taken along line A-A shown in FIG. 2(A), and FIG. 3(B) is a cross-sectional view taken along line B-B shown in FIG. 2(B). FIG. 4(A) shows a top view and a cross-sectional view of a weld zone in the conventional laser-welded lap joint, and FIG. 4(B) shows a top view and a cross-sectional view of a weld zone in the laser-welded lap joint according to aspects of the present invention.

Referring first to FIG. 1, the laser-welded lap joint 1 according to aspects of the present invention will be described.

In the laser-welded lap joint 1 according to aspects of the present invention, at least two steel sheets are lapped one over another. In the example shown in FIG. 1, two steel sheets, i.e., a steel sheet 2 having a substantially hat-shaped cross-sectional shape and including a vertical wall portion 2a and a flange portion 2b extending outward from an end of the vertical wall portion 2a and a flat panel-shaped steel sheet 3, are used. The steel sheet 2 and the steel sheet 3 are lapped so as to face each other, and a region (flat region) of the flange portion 2b of the steel sheet 2 serves as a joint surface. The two lapped steel sheets 2 and 3 are joined in the flange portion 2b by laser lap-welding. In the laser lap welding, a fusion zone that penetrates at least one of the steel sheets 2 and 3 to join the steel sheets 2 and 3 together is formed. The fusion zone and a heat-affected zone around the fusion zone form a weld zone 4.

The laser welding is performed by applying a laser beam 7 intermittently along the vertical wall portion 2a while the laser beam 7 is moved in a longitudinal direction. In this manner, as shown in FIG. 1, a plurality of weld zones 4 having a substantially linear surface shape are formed on the joint surface of the steel sheets 2 and 3. In the example described in this case, the two steel sheets 2 and 3 are lapped to form the laser-welded lap joint 1 according to aspects of the present invention. However, three or more steel sheets may be lapped.

Referring next to FIGS. 2 to 4, the technical idea according to aspects of the present invention and the structure of the weld zones 4 will be described. FIGS. 2(A), 3(A), and 4(A) show a weld zone 14 and its periphery in a conventional laser-welded lap joint, and FIGS. 2(B), 3(B), and FIG. 4(B) show a weld zone 4 and its periphery in the laser-welded lap joint according to aspects of the present invention.

In a conventional laser lap welding method, a weld zone is formed by performing welding at constant power and constant speed. Therefore, the size of a keyhole that is a governing factor of the width of fusion is constant even in the second half of the welding, and the weld zone 14 shown in FIG. 4(A) is generally formed. Specifically, the width W of the weld zone 14 is substantially constant from a start point S of the weld zone 14 to its end point E. In the lapped portion, the steel sheets 2 and 3 are fused by welding such that the fusion zone penetrates the entire steel sheets 2 and 3. At the terminal end point E of the weld zone 14, a crater 15 with a large cross-sectional area is formed in the upper steel sheet 2.

In the laser-welded lap joint welded by the conventional laser lap welding method, the depth of the crater 15 in the terminal end portion of the weld zone 14 is larger than the thickness of the uppermost steel sheet. Specifically, as shown in FIGS. 2(A) and 3(A), the crater 15 penetrates the steel sheet 2, and the depth $d_c$ of the crater 15 is equal to or larger than the thickness of the steel sheet 2. When the crater 15 has such a shape, tensile stress directed from the outer circumference of the fusion zone toward the outside (force in the direction of an arrow Fa shown in FIG. 2(A)) is concentrated on a central portion, which is a final solidification zone, at the terminal end point E of the weld zone 14. In this case, solidification cracking 16 may occur in the terminal end portion of the weld zone 14 and propagate therefrom.

However, in a laser lap welding method for forming the shape of the weld zone 4 in accordance with aspects of the present invention described later, the weld zone 4 is formed such that its width W is substantially constant from the starting edge S to a predetermined point and that the width W decreases gradually from the predetermined point toward the terminal end point E, as shown in FIG. 4(B). The steel sheets 2 and 3 in the lapped portion are welded such that, in the first half of the welding until the predetermined point, the fusion zone penetrates the entire steel sheets 2 and 3. However, in the second half of the welding after the predetermined point, the amount of the fused portion of the lower steel sheet 3 decreases. At the terminal end point E of the weld zone 4, a small crater 5 is formed in the upper steel sheet 2.

As shown in FIGS. 4(A) and 4(B), in contrast to the conventional crater 15, the size of the crater 5 formed at the terminal end point E of the weld zone 4 is smaller (shallower) than the thickness of the uppermost steel sheet. Specifically, as shown in FIGS. 2(B) and 3(B), the depth $d_c$ of the crater 5 is small, and the crater 5 does not penetrate the steel sheet 2. In the case of such a shape, the concentration of tensile stress directed from the outer circumference of the fusion zone toward the outside (force in the direction of an arrow Fb in FIG. 2(B)) on a central portion at the terminal end point E of the weld zone 4 (a central portion of a final solidification zone at the terminal end point E) is small. Therefore, the occurrence of solidification cracking in the terminal end portion of the weld zone 4 can be prevented.

In the laser-welded lap joint 1 according to aspects of the present invention, the surface size of the weld zone 4 is adjusted within a prescribed range based on the above-described technological idea. In particular, it is important to reduce the size of the crater 5 in the welding terminal end portion.

Specifically, as shown in FIG. 4(B), the weld zone 4 includes a main weld zone 4a that penetrates the steel sheets in the lapped portion and a final weld zone 4b formed continuously with one end of the main weld zone 4a and having the crater 5. The weld zone 4 satisfies the above formulas (1) to (4).

(Full Length L (mm) of Weld Zone 4: L≥15.0 mm)

If the full length L of each weld zone 4 is shorter than 15.0 mm, the length L2 (mm) of the final weld zone 4b described later is insufficient, and weld cracking occurs. Therefore, the full length L of the weld zone 4 is set to 15.0 mm or more (formula (1) above). Preferably, the full length L is 20.0 mm or more. The upper limit of the full length L of the weld zone 4 is not particularly specified. However, from the viewpoint of preventing an increase in the time for welding the components, the full length L is preferably 40.0 mm or less and more preferably 30.0 mm or less.

(Length L2 (mm) of Final Weld Zone 4b: $10.0 \geq L2 \geq 2l_c$)

If the length $l_c$ of the crater 5 in the final weld zone 4b is larger than ½ of the length L2 of the final weld zone 4b, the ratio of the crater 5 to the terminal end portion (the final weld zone 4b) of the weld zone 4 is large, so that the occurrence of weld cracking cannot be prevented. Therefore, the length $l_c$ of the crater 5 in the final weld zone 4b is equal to or less than ½ of the length L2 (mm) of the final weld zone 4b. Specifically, the length L2 of the final weld zone 4b is equal to or larger than 2 times the length $l_c$ of the crater 5 in the final weld zone 4b (formula (2) above) and is preferably 7.0 mm or more. From the viewpoint of preventing the occurrence of weld cracking, the upper limit of the length L2 of the final weld zone 4b is 10.0 mm or less and preferably 9.5 mm or less.

(Thickness t1 (mm) of Uppermost Steel Sheet in Lapped Portion: $t1 \geq 2d_c$)

If the depth $d_c$ of the crater 5 in the final weld zone 4b is larger than ½ of the thickness of the uppermost steel in the lapped portion (the uppermost one of the plurality of lapped steel sheets in the lapped portion), underfill on the surface of the steel sheets is significant. Therefore, the tensile stress concentration on the terminal end point E of the weld zone 4 increases, and weld cracking is likely to occur. When weld cracking occurs, fracture tends to occur from the weld cracking portion in a peeling strength evaluation test as shown in Examples according to aspects of the invention described later, and the target peeling strength according to aspects of the present invention may not be obtained. Therefore, the depth $d_c$ of the crater 5 in the final weld zone 4b is set to be equal to or less than ½ of the thickness t1 (mm) of the uppermost steel sheet in the lapped portion. Specifically, the thickness t1 of the uppermost steel sheet in the lapped portion is set to be equal to or larger than 2 times the depth $d_c$ of the crater 5 in the final weld zone 4b (formula (3) above).

In the following description, "the thickness t1 of the uppermost steel sheet in the lapped portion" is as follows. In the case of the example shown in FIG. 4(B), "t2" in the figure corresponds to the above t1.

In accordance with aspects of the present invention, the lower limit of the depth $d_c$ of the crater 5 in the final weld zone 4b is not particularly specified. However, from the viewpoint of actual operation, the depth $d_c$ of the crater 5 in the final weld zone 4b is preferably equal to or less than ⅓ of the thickness t1 (mm) of the uppermost steel sheet in the lapped portion. Specifically, the thickness t1 of the uppermost steel sheet in the lapped portion is preferably equal to or more than 3 times the depth $d_c$ of the crater 5 in the final weld zone 4b ($3d_c \leq t1$). More preferably, the thickness t1 of the uppermost steel sheet in the lapped portion is 0.7 mm or more.

From the viewpoint of performing welding efficiently without lowering the laser power as much as possible, the depth $d_c$ of the crater 5 in the final weld zone 4b is preferably equal to or more than 1/10 of the thickness t1 (mm) of the uppermost steel sheet in the lapped portion. Specifically, the thickness t1 of the uppermost steel sheet in the lapped portion is preferably equal to or less than 10 times the depth $d_c$ of the crater 5 in the final weld zone 4b ($10 \times d_c \geq t1$).

(Width $w_c$ (mm) of Crater 5 in Final Weld Zone 4b: $w_c > d_c$)

Even when the depth $d_c$ of the crater 5 in the final weld zone 4b is equal to or less than ½ of the thickness t1 of the uppermost steel sheet in the lapped portion, if the depth $d_c$ of the crater 5 in the final weld zone 4b is equal to or more than the width $w_c$ of the crater 5 in the final weld zone 4b, underfill on the surface of the steel sheet is significant. In this case, the concentration of tensile stress on the terminal end point E of the weld zone 4 increases, and weld cracking is likely to occur. When a weld crack occurs, fracture tends to be initiated from the weld crack in a peeling strength evaluation test as shown in Examples according to aspects of the invention described later, and the target peeling strength according to aspects of the present invention may not be obtained. Therefore, the depth $d_c$ of the crater 5 in the final weld zone 4b is set to be less than the width $w_c$ of the crater 5 in the final weld zone 4b. Specifically, the width $w_c$ of the crater 5 in the final weld zone 4b is larger than the depth $d_c$ of the crater 5 in the final weld zone 4b (formula (4) above). Preferably, the width $w_c$ of the crater 5 in the final weld zone 4b is 0.15 mm or more.

The lower limit of the depth $d_c$ of the crater 5 in the final weld zone 4b is not particularly specified. However, from the viewpoint of actual operation, the depth $d_c$ of the crater 5 is preferably 0.30 mm or more.

As the size of the crater 5 in the final weld zone 4b increases, the degree of underfill increases. Therefore, preferably, the width $w_c$ of the crater 5 in the final weld zone 4b is set to be 2 mm or less.

As described above, in the weld zone 4 in accordance with aspects of the present invention, the main weld zone 4a and the final weld zone 4b are formed so as to satisfy the above prescribed ranges, and the effects obtained by reducing the size of the crater 5 can be maximized. Therefore, excessive stress concentration on the terminal end point E of the weld zone 4 can be prevented, and the occurrence of weld cracking can be prevented. In this case, even when the minimum value of the full length L of the weld zone 4 is short, i.e., 15.0 mm, the occurrence of weld defects at the end of the weld zone can be prevented.

The laser-welded lap joint 1 according to aspects of the present invention is configured as described above, and the target characteristics according to aspects of the invention can thereby be obtained. However, the following optional structural features may be added in addition to the above described structural features.

(Ratio of Total Size of Gaps (Mm) Between Steel Sheets to Total Thickness T (Mm) of Plurality of Steel Sheets: 0% or More and 15% or Less)

In accordance with aspects of the present invention, the ratio of the total size G of gaps between steel sheets (hereinafter may be referred to as the total sheet gap) in the lapped portion including the plurality of lapped steel sheets to the total thickness T (mm) of the plurality steel sheets may be 0% or more and 15% or less. In the example shown in FIG. 4(B), the gap (sheet gap) between steel sheets is present only between the steel sheets 2 and 3. Let the total sheet gap be denoted by G mm, and let the total thickness T of the plurality of steel sheets be denoted by (t2+t3) mm. Then 0%≤G/(t2+t3)≤15% holds. By controlling the ratio of the total sheet gap G (mm) to the total thickness T (mm) of the plurality of steel sheets within the above range, the degree of underfill is reduced, and the stress concentration on the weld zone formed on the lapped surfaces is reduced. Therefore, weld cracking can be prevented, and the peeling strength can be further improved. The ratio of the total sheet gap G (mm) to the total thickness T (mm) of the plurality of steel sheets is more preferably 5% or more and is more preferably 10% or less.

(Chemical Composition of Steel Sheets)

No particular limitation is imposed on the chemical composition of the steel sheets used for the laser-welded lap joint 1 according to aspects of the present invention. At least one steel sheet of the plurality of lapped steel sheets may have a chemical composition containing, in mass %, for example, C: more than 0.07% and 0.25% or less, P+S: less than 0.03%, Mn: 1.8% or more and 3.0% or less, and Si: more than 1.2% and 2.5% or less, with the balance being Fe and unavoidable impurities. % in the chemical composition means % by mass.

(C: More than 0.07% and 0.25% or Less)

When the content of C exceeds 0.07%, the effect of precipitation strengthening can be obtained. When the content of C is 0.25% or less, coarse carbide precipitates may not be formed, and desired high strength and desired workability can be obtained. Therefore, the content of C is preferably more than 0.07% and 0.25% or less. More preferably, the content of C is 0.10% or more and 0.21% or less.

(P+S: Less than 0.03%)

When the total of the content of P and the content of S (P+S) is less than 0.03%, ductility and toughness do not deteriorate, and the desired high strength and the desired workability can be obtained. Therefore, the total (P+S) of the content of P and the content of S is preferably less than 0.03%.

(Mn: 1.8% or More and 3.0% or Less)

When the content of Mn is 1.8% or more, sufficient hardenability can be obtained, so that coarse carbide precipitates are unlikely to be formed. When the content of Mn is 3.0% or less, susceptibility to grain boundary embrittlement increases, and toughness and resistance to low-temperature cracking are unlikely to deteriorate. Therefore, the content of Mn is preferably 1.8% or more and 3.0% or less. The content of Mn is more preferably 1.9% or more. The content of Mn is more preferably 2.7% or less and still more preferably 2.5% or less.

(Si: More than 1.2% and 2.5% or Less)

When the content of Si is more than 1.2%, the effect of increasing the strength of the steel by solid solution strengthening can be obtained sufficiently. When the content of Si is 2.5% or less, the heat-affected zone is less likely to be excessively hardened, and the toughness of the heat-affected zone and its resistance to low-temperature cracking are unlikely to deteriorate. Therefore, the content of Si is preferably more than 1.2% and 2.5% or less. More preferably, the content of Si is 1.3% or more and 1.5% or less.

(Balance: Fe and Unavoidable Impurities)

The balance of the chemical composition is Fe and unavoidable impurities. Examples of the unavoidable impurities include Al: 0.015 to 0.050% and N: 0.002 to 0.005%.

Moreover, to further improve the strength of the steel sheets and their peeling strength, one or two selected from the following group A and group B may be optionally contained in addition to the above-described chemical composition.

(Group A: In Mass %, One or Two Selected from Ti: 0.005% or More and 0.01% or Less and Nb: 0.005% or More and Less than 0.050%)

Ti and Nb precipitate as carbides or nitrides and have the effect of preventing austenite from coarsening during annealing. Therefore, when Ti and/or Nb is contained, it is preferable to contain at least one of them. When Ti and/or Nb is contained in order to obtain the above effect, it is preferable to contain Ti in an amount of 0.005% or more and/or Nb in an amount of 0.005% or more. Even though excessively large amounts of these elements are contained, the efficacy of the above effect is saturated, and this may rather be uneconomical. Moreover, the recrystallization temperature during annealing increases, and the metallographic structure after annealing may become nonuniform, so that stretch flangeability may deteriorate. In addition, the amount of precipitated carbides or nitrides may increase. In this case, an increase in yield ratio may occur, and deterioration in shape fixability may also occur. Therefore, when Ti and/or Nb is contained, the content of Ti is preferably 0.01% or less, and the content of Nb is preferably less than 0.050%. The content of Ti is more preferably less than 0.0080%. The content of Nb is more preferably less than 0.040%.
(Group B: In Mass %, One or Two or More Selected from Cr: 1.0% or Less, Mo: 0.50% or Less, and B: 0.10% or Less)

Cr, Mo, and B are elements having the effect of improving the hardenability of the steel. Therefore, at least one of these elements may be contained. However, even though excessively large amounts of these elements are contained, the above effect is saturated, and this may rather be uneconomical. Therefore, when Cr, Mo, and B are contained, the content of Cr is 1.0% or less, the content of Mo is 0.50% or less, and the content of B is 0.10% or less. The content of Cr is more preferably 0.50% or less. The content of Mo is more preferably 0.10% or less. The content of B is more preferably 0.03% or less and still more preferably 0.0030% or less. The content of Cr is preferably 0.01% or more. The content of Mo is preferably 0.004% or more. The content of B is preferably 0.0001% or more.
(Tensile Strength of Steel Sheets)

At least one steel sheet of the plurality of steel sheets used for the laser-welded lap joint 1 according to aspects of the present invention may be a high-tensile steel sheet having a tensile strength TS of 980 MPa or more. Even when at least one steel sheet is the above high-tensile steel sheet, the laser-welded lap joint 1 can have high joint strength, and the occurrence of weld defects can be prevented. Preferably, for example, at least one steel sheet of the plurality of steel sheets has the above-described chemical composition and has a tensile strength TS of 980 MPa or more. The plurality of steel sheets may be of the same type and may have the same shape, but different types of steel sheets or steel sheets with different shapes may be used.
(Thicknesses of Steel Sheets)

In accordance with aspects of the present invention, no particular limitation is imposed on the thicknesses t of the plurality of steel sheets to be subjected to laser lap welding. However, the thicknesses are preferably within the range of, for example, 0.5 mm≤t≤3.2 mm. Steel sheets with thicknesses within the above range can be used preferably for automobile exterior body panels and automobile frame components. The thicknesses of the plurality of steel sheets may be the same or different.

Specifically, in the laser-welded lap joint 1 shown in FIG. 1 etc., it is preferable that the thickness t2 of the upper steel sheet 2 satisfies 0.6 mm≤t2≤1.2 mm and that the thickness t3 of the lower steel sheet 3 satisfies 1.0 mm≤t3≤2.5 mm. Alternatively, it is preferable that the thickness t2 of the upper steel sheet 2 and the thickness t3 of the lower steel sheet 3 fall within the ranges of 0.5 mm≤t2≤3.2 mm and 0.5 mm≤t3≤3.2 mm.

The "weld cracking" in accordance with aspects of the present invention is low-temperature cracking that occurs at the welding terminal end portion of the weld zone 4 and propagates from the welding terminal end point E to the welding starting edge S. The presence or absence of the weld cracking can be determined by cutting the weld zone 4 after welding and checking the presence or absence of cracking. The presence or absence of cracking can be checked by visual inspection. To check the presence of cracking more clearly, it is preferable to observe the cross section of the weld zone, for example, under an optical microscope at a magnification of about 10×. When a photograph of the cross section of the weld zone is taken, the weld zone is cut in a direction perpendicular to the welding direction at a position spaced 5 mm apart from the welding terminal end portion using a precision cutter. Weld cracking observed penetrates the weld zone 4 from the front surface to the back surface.

<Method for Producing Laser-Welded Lap Joint>

Figure 5:
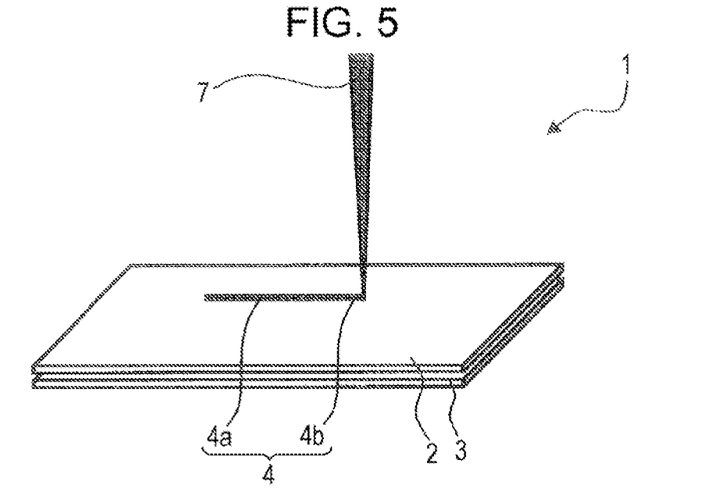
FIG. 5 is a perspective view illustrating a welding method for the laser-welded lap joint according to aspects of the present invention.

First, a method for producing the laser-welded lap joint 1 according to aspects of the present invention will be described using FIG. 5. FIG. 5 is an illustration showing an example of the method for producing the laser-welded lap joint 1 according to aspects of the present invention.

The method for producing the laser-welded lap joint 1 according to aspects of the present invention is the method for producing the above-described laser-welded lap joint 1 and includes: lapping the plurality of steel sheets vertically; and then performing laser lap welding by applying a laser beam to the surface of the uppermost steel sheet in the lapped portion including the plurality of lapped steel sheets to form a weld zone 4 in the lapped portion to thereby join the plurality of lapped steel sheets together.

In according to aspects the present invention, one-side welding is performed on the plurality of lapped steel sheets. By performing one-side welding, space-saving can be achieved in an assembly line for automobile body components. In the one-side welding, it is preferable that laser lap welding is performed from the side on which a thicker steel sheet among the plurality of lapped steel sheets is disposed. In this manner, the occurrence of burn through can be prevented. When the steel sheets have the same thickness, laser lap welding may be performed from any side.

In the example shown in FIG. 5, the laser-welded lap joint 1 according to aspects of the present invention can be obtained by laser lap welding. Specifically, the steel sheets 2 and 3 are lapped, and the laser beam 7 is applied linearly to the surface of the outermost steel sheet 2 so as to form the weld zone 4 in the steel sheets 2 and 3.

In the laser lap welding described above, the laser beam 7 is continuously applied while scanned linearly. For example, as shown in FIG. 5, the main weld zone 4a and the final weld zone 4b are formed continuously to form the weld zone 4. In this case, by performing a main welding step of forming the main weld zone 4a and a final welding step of forming the final weld zone 4b continuously, the effect of the crater 5 with a reduced size can be maximized. This is preferable because excessive stress concentration on the terminal end point E of the weld zone 4 (see FIGS. 2(B) and 3(B)) can be prevented and the occurrence of cracking can be prevented.

The laser lap welding in accordance with aspects of the present invention includes the main welding step of forming the main weld zone 4a and the final welding step of forming the final weld zone 4b having the crater 5. The main welding step is the first half of the welding, and main welding is performed to form a weld zone penetrating all the steel sheets in the lapped portion. In the final welding step subsequent to the main welding step, final welding is performed until the terminal end point E of the weld zone 4 while welding conditions described later are controlled for the purpose of reducing the size of the crater 5 formed at the terminal end point E of the weld zone 4. Preferably, at least one of laser power, welding speed, a focal position, and a beam diameter in the final welding step is controlled such that the main weld zone 4a and the final weld zone 4b having the crater 5 form the weld zone 4 satisfying formulas (1) to (4) described above. In the main welding step, the welding is performed under constant conditions.

Examples of the laser beam that can be used include a fiber laser and a disk laser. It is preferable that the beam diameter is 0.3 to 0.8 mm, that the laser power is 2.0 to 5.0 kW, that the focal position is located in the range extending from the surface of the outermost steel sheet to a position 0 to 20 mm above the surface of the outermost steel sheet, and that the welding speed is 2.0 to 5.0 m/min.

During the formation of the main weld zone 4a, it is more preferable to control the beam diameter within the range of 0.5 to 0.8 mm, the laser power within the range of 2.5 to 4.5 kW, the focal position within the range extending from the surface of the uppermost steel sheet to a position 20 mm above the surface of the uppermost steel sheet, and the welding speed within the range of 2.5 to 4.5 m/min.

During the formation of the final weld zone 4b, it is preferable to control the beam diameter within the range of 0.2 to 0.6 mm, the laser power within the range of 0.5 to 3.0 kW, the focal position within the range extending from the surface of the uppermost steel sheet to a position 30 mm above the surface of the uppermost steel sheet, and the welding speed within the range of 2.0 to 4.0 m/min.

Figure 8:
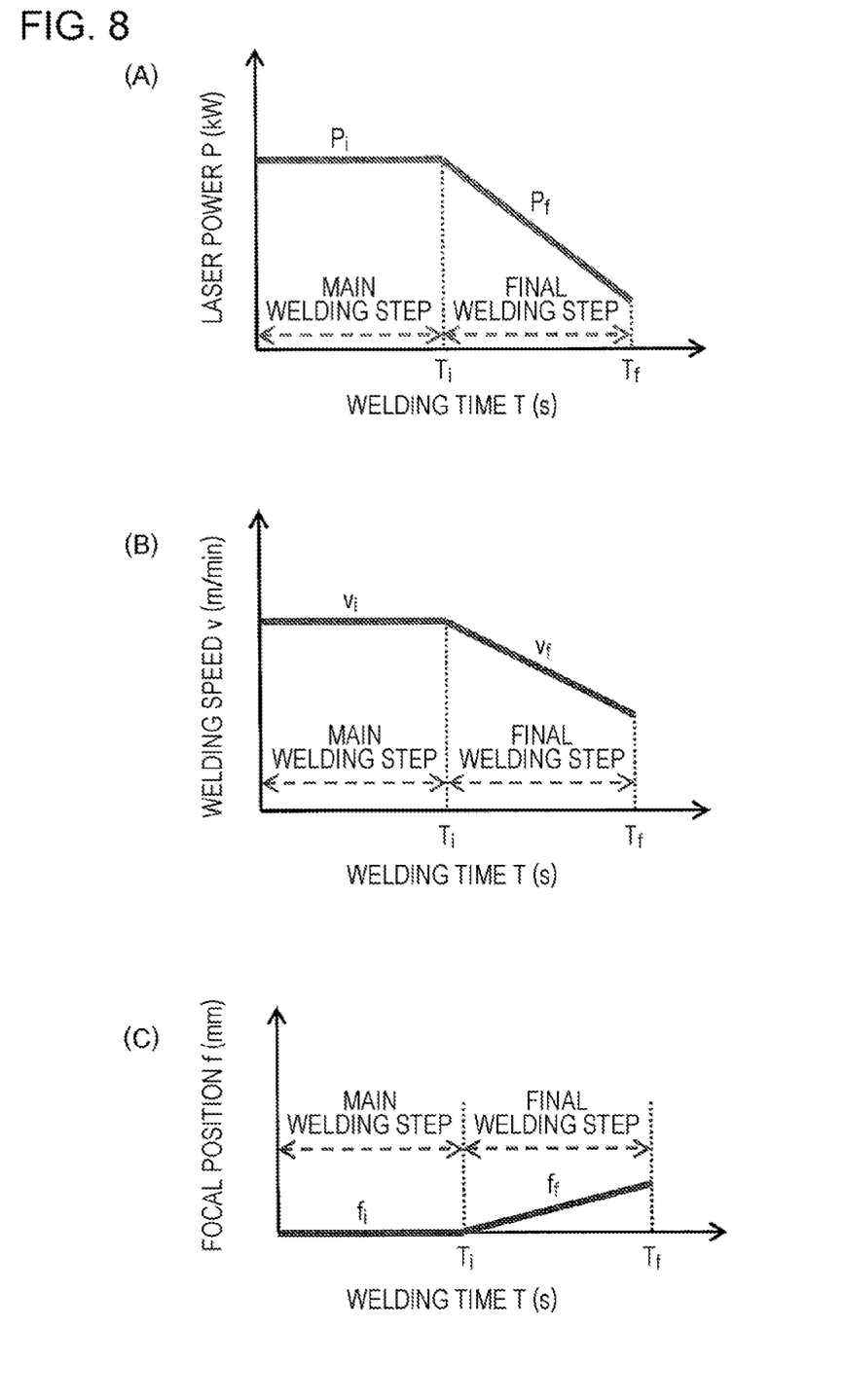
FIG. 8 shows graphs of an example of laser lap welding conditions in a method for producing the laser-welded lap joint according to aspects of the present invention, FIG. 8(A) showing the relation between laser power and welding time, FIG. 8(B) showing the relation between welding speed and the welding time, FIG. 8(C) showing the relation between a focal position and the welding time.

It is more preferable that the laser power, the welding speed, and the focal position are controlled such that the relations between the laser power $P_i$, the welding speed $v_i$, and the focal position $f_i$ in the main welding step and the laser power $P_f$, the welding speed $v_f$, and the focal position $f_f$ in the final welding step are as shown in graphs in FIGS. 8(A) to 8(C). Specifically, at least one of the laser power, the welding speed, the focal position, and the beam diameter in the final welding step can be controlled under the conditions satisfying formulas (5) to (7).

$$P_i \geq P_f \geq (1/4)P_i \quad (5)$$

$$v_i \geq v_f \geq (1/4)v_i \quad (6)$$

$$f_i \leq f_f \leq 20.0 \quad (7)$$

Here, $P_i$ is the laser power (unit: kW) in the main welding step, and $P_f$ is the laser power (unit: kW) in the final welding step. $v_i$ is the welding speed (unit: m/min) in the main welding step, and $v_f$ is the welding speed (unit: m/min) in the final welding step. $f_i$ is the focal position (unit: mm) in the main welding step, and $f_f$ is the focal position (unit: mm) in the final welding step.

$$P_i \geq P_f \geq (1/4)P_i \quad (5)$$

If the laser power $P_f$ (kW) in the final welding step is larger than the laser power $P_i$ (kW) in the main welding step, the degree of underfill increases, and burn through may occur. More preferably, the laser power $P_f$ in the final welding step is $(P_i \times 0.5)$ or less.

If the laser power $P_f$ in the final welding step is less than 1/4 of the laser power $P_i$ in the main welding step, the laser power is insufficient, and the steel sheets cannot be melted. Therefore, a sufficient weld line length cannot be obtained, and peeling strength may be insufficient. More preferably, the laser power $P_f$ in the final welding step is $(P_i \times 1/3)$ or more.

$$v_i \geq v_f \geq (1/4)v_i \quad (6)$$

If the welding speed $v_f$ (m/min) in the final welding step exceeds the welding speed $v_i$ (m/min) in the main welding step, the depth $d_c$ of the crater 5 in the final weld zone 4b may increase. More preferably, the welding speed $v_f$ in the final welding step is $(v_i \times 0.8)$ or less.

If the welding speed $v_f$ in the final welding step is less than 1/4 of the welding speed $v_i$ in the main welding step, the size of the crater 5 in the final weld zone 4b increases, and burn through may occur. More preferably, the welding speed $v_f$ in the final welding step is $(v_i \times 1/2)$ or more.

$$f_i \leq f_f \leq 20.0 \quad (7)$$

If the focal position $f_f$ (mm) in the final welding step is less than the focal position $f_i$ (mm) in the main welding step, the depth $d_c$ of the crater 5 in the final weld zone 4b may increase. More preferably, the focal position $f_f$ in the final welding step is $(f_i \times 1.2)$ or more.

If the focal position $f_f$ in the final welding step exceeds 20.0 mm, the power density of the laser beam is insufficient, and the steel sheets cannot be melted. Therefore, a sufficient weld line length cannot be obtained, and the peeling strength may be insufficient. More preferably, the focal position $f_f$ in the final welding step is 15.0 mm or less.

In the welding method according to aspects of the present invention, the steel sheets 2 and 3 used may be, for example, steel sheets having the above-described chemical composition and having a tensile strength TS of 980 MPa or more. As for the thicknesses t2 and t3 of the steel sheets 2 and 3, 0.5 mm≤t2≤3.2 mm holds, and 0.5 mm≤t3≤3.2 mm holds. The sheet gap between the steel sheets 2 and 3 may be 0% or more and 15% or less of the total thickness of the steel sheets 2 and 3. The reason that these steel sheets are used is the same as above.

Next, an example of a preferred welding position in the laser-welded lap joint 1 according to aspects of the present invention will be described using FIG. 6.

Figure 6:
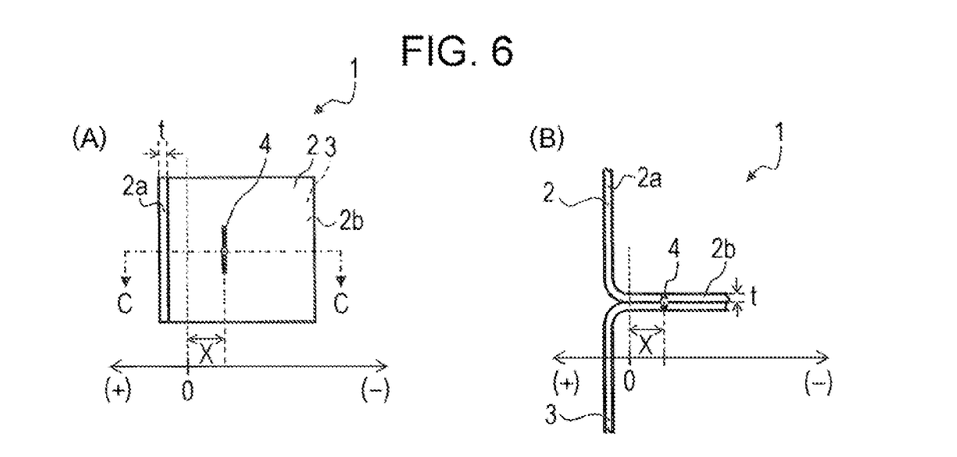
FIG. 6(A) is a top view illustrating the position of the weld zone (fusion zone) in the laser-welded lap joint according to aspects of the present invention.
FIG. 6(B) is a cross-sectional view taken along line C-C in FIG. 6(A).

FIG. 6 shows illustrations of an example of a preferred position of the weld zone (fusion zone) 4 in the laser-welded lap joint 1 according to aspects of the present invention. FIG. 6(A) is a top view showing the periphery of the weld zone 4 in the two steel sheets 2 and 3, and FIG. 6(B) is a cross-sectional view taken along line C-C in FIG. 6(A). In the description of FIG. 6, the steel sheet 2 is referred to also as a flange portion 2b, and the steel sheet 3 is referred to also as a frame component.

In the example shown in FIGS. 6(A) and 6(B), the position coordinate of an end of the contact portion between the flange portion 2b that is the upper steel sheet 2 and the frame component that is the lower steel sheet 3 is set to 0. In this coordinate system, the outer end side of the flange portion 2b is set to (−), and the vertical wall portion 2a side in a substantially hat shape (only part of the substantially hat shape is shown in FIG. 6) is set to (+). In the flange portion 2b in the substantially hat shape, the thickness of a thickest portion of the steel sheet is denoted by t (mm). In this case, it is preferable to perform welding at a welding position X (mm) represented by formula (8) below by applying the one-side welding method. In this manner, an L-form tension-test piece shown in FIG. 7, including two lapped sheets, having a total thickness T of 2 to 5 mm, and having the flange portion 2b with a length of 50 mm can have a peeling strength of 1.2 kN or more.

$$-2t \geq X \geq -4t \quad (8)$$

The reason that X is set so as to satisfy formula (8) above will be described.

If the welding position X is closer to the contact end of the flange portion 2b than −2t, rupture tends to occur from the weld metal portion during the tensile test, and the peeling strength may also decrease. If the welding position X is farther from the contact end of the flange portion 2b than −4t, the moment applied to the weld zone 4 tends to increase, and the peeling strength may decrease. It is therefore preferable to set the welding position X so as to satisfy formula (8) above.

<Automobile Frame Component>

One example of a component for which the laser-welded lap joint 1 according to aspects of the present invention can be preferably used is an automobile frame component. In the automobile frame component shown in FIG. 1, the steel sheet 2 that is a frame component having a hat-shaped cross-sectional shape and the steel sheet 3 that is a panel component are used. In the automobile frame component, the flange portion 2b of the frame component (the steel sheet 2 shown in FIG. 1) and the panel component (the steel sheet 3 shown in FIG. 1) disposed so as to face the flange portion 2b are welded by the above-described welding method to form the weld zones 4, and a closed cross section is thereby formed.

The automobile frame component according to aspects of the present invention is preferably used, for example, for center pillars, roof rails, etc. It is important in terms of collision safety that these components have sufficient peeling strength. A center pillar to which the automobile frame component according to aspects of the present invention is applied has sufficient peeling strength as described above.

As described above, in accordance with aspects of the present invention, a plurality of steel sheets including at least one high-tensile steel sheet are lapped, and a weld zone 4 is formed to weld and join the plurality of steel sheets together. In this manner, a laser-welded lap joint 1 with no weld defects formed on the front and back surfaces of the steel sheets can be obtained.

In the weld zone 4 in accordance with aspects of the present invention, the size of the crater at the end of the fusion zone can be reduced, and therefore the concentration of tensile stress on a central portion of the final solidification zone is reduced. In this case, the occurrence of cracking at the end of the fusion zone and propagation of the cracking can be prevented, and therefore the laser-welded lap joint 1 produced can have high peeling strength and excellent durability.

Moreover, even when the length of the fusion zone (15 mm) is shorter than that in conventional laser lap welding, the occurrence of weld cracking can be prevented. It is therefore expected that flexibility in the design of components is improved and the strength is improved by welding many portions necessary to have high peeling strength.

Moreover, since the laser-welded lap joint 1 according to aspects of the present invention has good appearance, it can be used preferably for structural members of automobiles. For example, by using high-strength steel sheets as the steel sheets to be joined, an automobile frame component can be obtained. By using such a laser-welded lap joint 1, an automobile frame component etc. with high peeling strength can be obtained.

EXAMPLES

The operations and effects according to aspects of the present invention will be described by way of Examples. However, the present invention is not limited to the following Examples.

In the Examples, steel sheets having chemical compositions shown in Table 1 were used as test specimens.

Figure 7:
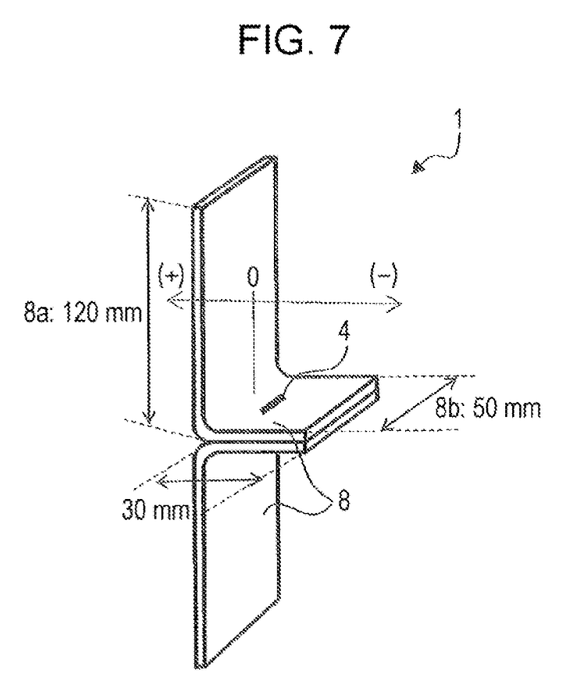
FIG. 7 is an illustration showing an example of a laser-welded lap joint in an Example according to aspects of the present invention.

The thickness of each steel sheet is 1.2 mm, 1.6 mm, or 2.0 mm, and its width is 50 mm. These steel sheets were used and bent into a shape with an L-shaped cross section as shown in FIG. 7. The L-shaped steel sheets 8 each have a long-side portion 8a and a short-side portion 8b. The long-side portion 8a corresponds to the vertical wall portion 2a of the steel sheet 2 of the laser-welded lap joint 1 shown in FIG. 1, and the short-side portion 8b corresponds to the flange portion 2b.

Two L-shaped steel sheets 8 of the same type and having the same thickness were used, and the short-side portions 8b of the steel sheets were lapped. Then laser lap welding was performed at a plurality of positions of the lapped portion (a flat portion in FIG. 7) intermittently in a longitudinal direction to form weld beads (weld zones 4), and an L-shaped-test piece (hereinafter referred to as a test piece) was thereby produced. As for the size of the test piece, the size of the long-side portion 8a (the length of the vertical wall) was 120 mm, the size of the short-side portion 8b (the width of the test piece) was 50 mm, and the size of the lapped portion (the width of the flange) was 30 mm. The gap (sheet gap) G between the upper and lower L-shaped steel sheets 8 was appropriately adjusted within the range of 0 to 20% according to the thickness of the sheets.

The conditions for the weld zones 4 formed by the laser lap welding are shown in Tables 2-1 and 2-2.

As shown in FIG. 7, the coordinate of the welding position is represented in a coordinate system in which, in the lapped portion including the two L-shaped steel sheets 8, a contact position closest to the vertical wall is set to 0. In this coordinate system, the outside of the lapped portion of the test piece is set to (−), and the vertical wall side of the test piece is set to (+). The welding position in this case is denoted by X, and the full length of each fusion zone (weld zone) 4 is denoted by L. The length of the terminal end portion (the final weld zone 4b) of each weld zone 4 is denoted by L2, and the length of the crater 5 in the final weld zone 4b is denoted by $l_c$. The depth of the crater 5 in the final weld zone 4b is denoted by $d_c$, and the width of the crater 5 in the final weld zone 4b is denoted by $w_c$. The test was performed on various test pieces with different dimensional values.

A fiber laser with a beam diameter of 0.6 mm φ at the focal position was used for the laser welding. The laser power, the welding speed, and the focal position in each of the main welding step and the final welding step were controlled so as to satisfy the relations shown in the graphs in FIGS. 8(A) to 8(C), and the size of the crater 5 in the final weld zone 4b was thereby adjusted. A work distance was set to the surface of the uppermost steel sheet. The focal position in the laser lap welding was set to 0 on the surface of the upper most one of the lapped steel sheets (the surface of the upper L-shaped steel sheet 8 in the example shown in FIG. 7), and the vertically upward direction relative to the L-shaped steel sheets 8 was set to positive. The welding was performed in air.

The peeling strength was measured by an L-form tension test. Specifically, steel sheets 8 bent into an L shape were lapped as shown in FIG. 7 and lap laser-welded, and a tensile load was applied from opposite sides of the welded steel sheets. The tensile test was performed according to JIS Z3136 at a speed of 10 mm/min. When the peeling strength was 1.2 kN or more, the test piece was regarded as having high joint strength and rated "pass."

The occurrence of cracking can be determined by visual inspection and a liquid penetrant test. In the Examples, the occurrence of cracking was determined by visual inspection as described above. Specifically, each of the obtained test pieces was cut in a direction perpendicular to the welding direction at a position 5 mm from the center of the crater 5 in the final weld zone 4b toward the welding start side. The section was observed under an optical microscope at a magnification of 10×. One test piece was observed for each of the conditions. When weld cracking penetrating the weld zone 4 from the front surface to the back surface was found, the test piece was judged as having weld cracking.

The obtained judgement results for weld cracking and peeling strength are shown in Tables 2-1 and 2-2.

TABLE 1

| Steel type | Chemical composition (% by mass) | | | | | | | | | | | |
|---|---|---|---|---|---|---|---|---|---|---|---|---|
| | C | Si | Mn | P | S | Ti | Nb | Cr | Mo | B | Al | N |
| A | 0.21 | 1.5 | 2.0 | 0.004 | 0.0007 | — | — | — | — | — | 0.031 | 0.0025 |
| B | 0.12 | 1.4 | 2.0 | 0.015 | 0.002 | 0.0017 | 0.042 | — | — | — | 0.031 | 0.0040 |
| C | 0.13 | 1.3 | 2.0 | 0.014 | 0.002 | — | — | 0.019 | 0.010 | 0.0001 | 0.028 | 0.0050 |
| D | 0.13 | 1.4 | 2.1 | 0.013 | 0.002 | 0.0050 | 0.039 | 0.020 | 0.010 | 0.0001 | 0.028 | 0.0033 |
| E | 0.18 | 1.4 | 2.7 | 0.003 | 0.0009 | — | — | — | — | — | 0.025 | 0.0035 |
| F | 0.13 | 1.4 | 2.1 | 0.013 | 0.002 | 0.0020 | 0.001 | — | — | — | 0.033 | 0.0040 |
| G | 0.13 | 1.3 | 2.2 | 0.013 | 0.001 | — | — | 0.021 | 0.020 | 0.0002 | 0.029 | 0.0040 |
| H | 0.12 | 1.4 | 2.1 | 0.014 | 0.002 | 0.0018 | 0.045 | 0.023 | 0.020 | 0.0002 | 0.030 | 0.0050 |

TABLE 2-1

| Test No. | Steel type | TS (MPa) | Thickness t2 of steel sheet 2 (mm) | Thickness t3 of steel sheet 3 (mm) | Thickness t1 of uppermost steel sheet in lapped portion (mm) | Thickness t of thickest steel sheet in lapped portion (mm) | Total thickness T (mm) | Total sheet gap G (mm) | Welding position X (mm) | Full length L of weld zone (mm) | Length L2 of final weld zone (mm) | Main welding step Power Pi (kW) |
|---|---|---|---|---|---|---|---|---|---|---|---|---|
| 1 | A | 980 | 1.2 | 1.2 | 1.2 | 1.2 | 2.4 | 0.2 | −3.6 | 15.0 | 7.5 | 3.6 |
| 2 | A | 980 | 1.2 | 1.2 | 1.2 | 1.2 | 2.4 | 0.4 | −3.6 | 15.0 | 7.5 | 3.6 |
| 4 | A | 980 | 1.2 | 1.2 | 1.2 | 1.2 | 2.4 | 0.2 | −3.6 | 10.0 | 7.5 | 3.6 |
| 5 | A | 980 | 1.2 | 1.2 | 1.2 | 1.2 | 2.4 | 0.2 | −3.6 | 15.0 | 5.0 | 3.6 |
| 6 | A | 980 | 1.2 | 1.2 | 1.2 | 1.2 | 2.4 | 0.2 | −3.6 | 15.0 | 7.5 | 3.6 |
| 7 | A | 980 | 1.2 | 1.2 | 1.2 | 1.2 | 2.4 | 0.2 | −3.6 | 15.0 | 7.5 | 3.6 |
| 8 | A | 980 | 1.2 | 1.2 | 1.2 | 1.2 | 2.4 | 0.2 | −3.6 | 15.0 | 7.5 | 3.6 |
| 9 | E | 1180 | 1.2 | 1.2 | 1.2 | 1.2 | 2.4 | 0.2 | −3.6 | 15.0 | 7.5 | 3.6 |
| 10 | E | 1180 | 1.2 | 1.2 | 1.2 | 1.2 | 2.4 | 0.4 | −3.6 | 15.0 | 7.5 | 3.6 |
| 12 | E | 1180 | 1.2 | 1.2 | 1.2 | 1.2 | 2.4 | 0.2 | −3.6 | 10.0 | 7.5 | 3.6 |
| 13 | E | 1180 | 1.2 | 1.2 | 1.2 | 1.2 | 2.4 | 0.2 | −3.6 | 15.0 | 5.0 | 3.6 |
| 14 | E | 1180 | 1.2 | 1.2 | 1.2 | 1.2 | 2.4 | 0.2 | −3.6 | 15.0 | 7.5 | 3.6 |
| 15 | E | 1180 | 1.2 | 1.2 | 1.2 | 1.2 | 2.4 | 0.2 | −3.6 | 15.0 | 7.5 | 3.6 |
| 16 | E | 1180 | 1.2 | 1.2 | 1.2 | 1.2 | 2.4 | 0.2 | −3.6 | 15.0 | 7.5 | 3.6 |
| 17 | B | 980 | 1.6 | 1.6 | 1.6 | 1.6 | 3.2 | 0.3 | −4.8 | 15.0 | 7.5 | 4.8 |
| 18 | B | 980 | 1.6 | 1.6 | 1.6 | 1.6 | 3.2 | 0.5 | −4.8 | 15.0 | 7.5 | 4.8 |
| 20 | B | 980 | 1.6 | 1.6 | 1.6 | 1.6 | 3.2 | 0.3 | −4.8 | 10.0 | 7.5 | 4.8 |
| 21 | B | 980 | 1.6 | 1.6 | 1.6 | 1.6 | 3.2 | 0.3 | −4.8 | 15.0 | 5.0 | 4.8 |
| 22 | B | 980 | 1.6 | 1.6 | 1.6 | 1.6 | 3.2 | 0.3 | −4.8 | 15.0 | 7.5 | 4.8 |
| 23 | B | 980 | 1.6 | 1.6 | 1.6 | 1.6 | 3.2 | 0.3 | −4.8 | 15.0 | 7.5 | 4.8 |
| 24 | B | 980 | 1.6 | 1.6 | 1.6 | 1.6 | 3.2 | 0.3 | −4.8 | 15.0 | 7.5 | 4.8 |
| 25 | F | 1180 | 1.6 | 1.6 | 1.6 | 1.6 | 3.2 | 0.3 | −4.8 | 15.0 | 7.5 | 4.8 |
| 26 | F | 1180 | 1.6 | 1.6 | 1.6 | 1.6 | 3.2 | 0.5 | −4.8 | 15.0 | 7.5 | 4.8 |
| 28 | F | 1180 | 1.6 | 1.6 | 1.6 | 1.6 | 3.2 | 0.3 | −4.8 | 10.0 | 7.5 | 4.8 |
| 29 | F | 1180 | 1.6 | 1.6 | 1.6 | 1.6 | 3.2 | 0.3 | −4.8 | 15.0 | 5.0 | 4.8 |
| 30 | F | 1180 | 1.6 | 1.6 | 1.6 | 1.6 | 3.2 | 0.3 | −4.8 | 15.0 | 7.5 | 4.8 |
| 31 | F | 1180 | 1.6 | 1.6 | 1.6 | 1.6 | 3.2 | 0.3 | −4.8 | 15.0 | 7.5 | 4.8 |
| 32 | F | 1180 | 1.6 | 1.6 | 1.6 | 1.6 | 3.2 | 0.3 | −4.8 | 15.0 | 7.5 | 4.8 |
| 33 | C | 980 | 2.0 | 2.0 | 2.0 | 2.0 | 4.0 | 0.4 | −6.0 | 15.0 | 7.5 | 6.0 |
| 34 | C | 980 | 2.0 | 2.0 | 2.0 | 2.0 | 4.0 | 0.7 | −6.0 | 15.0 | 7.5 | 6.0 |
| 36 | C | 980 | 2.0 | 2.0 | 2.0 | 2.0 | 4.0 | 0.4 | −6.0 | 10.0 | 7.5 | 6.0 |

| Test No. | Main welding step Speed vi (m/min) | Main welding step Focal position fi (mm) | Final welding step Power Pf (kW) | Final welding step Speed vf (m/min) | Final welding step Focal position ff (mm) | Shape of crater Length lc (mm) | Shape of crater Depth dc (mm) | Shape of crater Width wcC (mm) | Evaluation Weld cracking | Evaluation Peeling strength (kN) | Remarks |
|---|---|---|---|---|---|---|---|---|---|---|---|
| 1 | 3.0 | 0.0 | 0.9 | 1.5 | 10.0 | 3.10 | 0.52 | 0.67 | No | 1.51 | Inventive Example |
| 2 | 3.0 | 0.0 | 0.9 | 1.5 | 10.0 | 3.13 | 0.87 | 0.73 | Yes | 0.78 | Comparative Example |
| 4 | 3.0 | 0.0 | 0.9 | 1.5 | 10.0 | 2.92 | 0.45 | 0.72 | Yes | 0.81 | Comparative Example |
| 5 | 3.0 | 0.0 | 0.9 | 1.5 | 10.0 | 3.05 | 0.50 | 0.71 | Yes | 1.56 | Comparative Example |
| 6 | 3.0 | 0.0 | 3.6 | 1.5 | 10.0 | 2.89 | 0.78 | 0.69 | Yes | 1.61 | Comparative Example |
| 7 | 3.0 | 0.0 | 0.9 | 3.0 | 10.0 | 5.32 | 0.51 | 0.63 | Yes | 1.28 | Comparative Example |
| 8 | 3.0 | 0.0 | 0.9 | 1.5 | 0.0 | 2.89 | 0.46 | 0.42 | Yes | 1.35 | Comparative Example |
| 9 | 3.0 | 0.0 | 0.9 | 1.5 | 10.0 | 2.96 | 0.57 | 0.73 | No | 1.52 | Inventive Example |
| 10 | 3.0 | 0.0 | 0.9 | 1.5 | 10.0 | 3.17 | 0.80 | 0.74 | Yes | 0.77 | Comparative Example |
| 12 | 3.0 | 0.0 | 0.9 | 1.5 | 10.0 | 2.92 | 0.41 | 0.67 | Yes | 0.90 | Comparative Example |
| 13 | 3.0 | 0.0 | 0.9 | 1.5 | 10.0 | 3.11 | 0.44 | 0.68 | Yes | 1.72 | Comparative Example |
| 14 | 3.0 | 0.0 | 3.6 | 1.5 | 10.0 | 3.14 | 0.88 | 0.72 | Yes | 1.93 | Comparative Example |
| 15 | 3.0 | 0.0 | 0.9 | 3.0 | 10.0 | 4.97 | 0.54 | 0.74 | Yes | 1.43 | Comparative Example |
| 16 | 3.0 | 0.0 | 0.9 | 1.5 | 0.0 | 3.21 | 0.49 | 0.43 | Yes | 1.67 | Comparative Example |
| 17 | 3.0 | 0.0 | 1.2 | 1.5 | 10.0 | 2.95 | 0.67 | 0.84 | No | 1.28 | Inventive Example |

TABLE 2-1-continued

| | | | | | | | | | | | |
|---|---|---|---|---|---|---|---|---|---|---|---|
| 18 | 3.0 | 0.0 | 1.2 | 1.5 | 10.0 | 3.18 | 1.15 | 0.82 | Yes | 0.84 | Comparative Example |
| 20 | 3.0 | 0.0 | 1.2 | 1.5 | 10.0 | 2.99 | 0.78 | 0.85 | Yes | 0.79 | Comparative Example |
| 21 | 3.0 | 0.0 | 1.2 | 1.5 | 10.0 | 3.06 | 0.66 | 0.94 | Yes | 1.58 | Comparative Example |
| 22 | 3.0 | 0.0 | 4.8 | 1.5 | 10.0 | 3.00 | 1.20 | 0.81 | Yes | 1.35 | Comparative Example |
| 23 | 3.0 | 0.0 | 1.2 | 3.0 | 10.0 | 4.88 | 0.68 | 0.94 | Yes | 1.76 | Comparative Example |
| 24 | 3.0 | 0.0 | 1.2 | 1.5 | 0.0 | 2.74 | 0.74 | 0.64 | Yes | 1.25 | Comparative Example |
| 25 | 3.0 | 0.0 | 1.2 | 1.5 | 10.0 | 3.19 | 0.77 | 0.94 | No | 1.64 | Inventive Example |
| 26 | 3.0 | 0.0 | 1.2 | 1.5 | 10.0 | 3.07 | 1.07 | 0.83 | Yes | 0.62 | Comparative Example |
| 28 | 3.0 | 0.0 | 1.2 | 1.5 | 10.0 | 2.88 | 0.68 | 0.95 | Yes | 0.82 | Comparative Example |
| 29 | 3.0 | 0.0 | 1.2 | 1.5 | 10.0 | 3.11 | 0.74 | 0.93 | Yes | 1.83 | Comparative Example |
| 30 | 3.0 | 0.0 | 4.8 | 1.5 | 10.0 | 3.09 | 1.04 | 0.90 | Yes | 1.56 | Comparative Example |
| 31 | 3.0 | 0.0 | 1.2 | 3.0 | 10.0 | 5.11 | 0.73 | 0.84 | Yes | 1.93 | Comparative Example |
| 32 | 3.0 | 0.0 | 1.2 | 1.5 | 0.0 | 2.80 | 0.75 | 0.73 | Yes | 1.14 | Comparative Example |
| 33 | 3.0 | 0.0 | 1.5 | 1.5 | 10.0 | 3.04 | 0.89 | 1.19 | No | 1.63 | Inventive Example |
| 34 | 3.0 | 0.0 | 1.5 | 1.5 | 10.0 | 2.99 | 1.43 | 1.25 | Yes | 0.93 | Comparative Example |
| 36 | 3.0 | 0.0 | 1.5 | 1.5 | 10.0 | 3.23 | 0.97 | 1.17 | Yes | 0.76 | Comparative Example |

TABLE 2-2

| Test No. | Steel type | TS (MPa) | Thickness t2 of steel sheet 2 (mm) | Thickness t3 of steel sheet 3 (mm) | Thickness t1 of uppermost steel sheet in lapped portion (mm) | Thickness t of thickest steel sheet in lapped portion (mm) | Total thickness T (mm) | Total sheet gap G (mm) | Welding position X (mm) | Full length L of weld zone (mm) | Length L2 of final weld zone (mm) | Main welding step Power Pi (kW) |
|---|---|---|---|---|---|---|---|---|---|---|---|---|
| 37 | C | 980 | 2.0 | 2.0 | 2.0 | 2.0 | 4.0 | 0.4 | −6.0 | 15.0 | 5.0 | 6.0 |
| 38 | C | 980 | 2.0 | 2.0 | 2.0 | 2.0 | 4.0 | 0.4 | −6.0 | 15.0 | 7.5 | 6.0 |
| 39 | C | 980 | 2.0 | 2.0 | 2.0 | 2.0 | 4.0 | 0.4 | −6.0 | 15.0 | 7.5 | 6.0 |
| 40 | C | 980 | 2.0 | 2.0 | 2.0 | 2.0 | 4.0 | 0.4 | −6.0 | 15.0 | 7.5 | 6.0 |
| 41 | G | 1180 | 2.0 | 2.0 | 2.0 | 2.0 | 4.0 | 0.4 | −6.0 | 15.0 | 7.5 | 6.0 |
| 42 | G | 1180 | 2.0 | 2.0 | 2.0 | 2.0 | 4.0 | 0.7 | −6.0 | 15.0 | 7.5 | 6.0 |
| 44 | G | 1180 | 2.0 | 2.0 | 2.0 | 2.0 | 4.0 | 0.4 | −6.0 | 15.0 | 7.5 | 6.0 |
| 45 | G | 1180 | 2.0 | 2.0 | 2.0 | 2.0 | 4.0 | 0.4 | −6.0 | 15.0 | 5.0 | 6.0 |
| 46 | G | 1180 | 2.0 | 2.0 | 2.0 | 2.0 | 4.0 | 0.4 | −6.0 | 15.0 | 7.5 | 6.0 |
| 47 | G | 1180 | 2.0 | 2.0 | 2.0 | 2.0 | 4.0 | 0.4 | −6.0 | 15.0 | 7.5 | 6.0 |
| 48 | G | 1180 | 2.0 | 2.0 | 2.0 | 2.0 | 4.0 | 0.4 | −6.0 | 15.0 | 7.5 | 6.0 |
| 49 | A | 980 | 1.2 | 1.2 | 1.2 | 1.2 | 2.4 | 0.2 | −3.6 | 40.0 | 10.0 | 3.6 |
| 50 | D | 980 | 1.6 | 1.6 | 1.6 | 1.6 | 3.2 | 0.3 | −4.8 | 40.0 | 10.0 | 4.8 |
| 51 | C | 980 | 2.0 | 2.0 | 2.0 | 2.0 | 4.0 | 0.4 | −6.0 | 40.0 | 10.0 | 6.0 |
| 52 | E | 1180 | 1.2 | 1.2 | 1.2 | 1.2 | 2.4 | 0.2 | −3.6 | 40.0 | 10.0 | 3.6 |
| 53 | H | 1180 | 1.6 | 1.6 | 1.6 | 1.6 | 3.2 | 0.3 | −4.8 | 40.0 | 10.0 | 4.8 |
| 54 | G | 1180 | 2.0 | 2.0 | 2.0 | 2.0 | 4.0 | 0.4 | −6.0 | 40.0 | 10.0 | 6.0 |
| 55 | A | 980 | 1.2 | 1.2 | 1.2 | 1.2 | 2.4 | 0.0 | −3.6 | 15.0 | 7.5 | 3.6 |
| 56 | D | 980 | 1.6 | 1.6 | 1.6 | 1.6 | 3.2 | 0.0 | −4.8 | 15.0 | 7.5 | 4.8 |
| 57 | C | 980 | 2.0 | 2.0 | 2.0 | 2.0 | 4.0 | 0.0 | −6.0 | 15.0 | 7.5 | 6.0 |
| 58 | E | 1180 | 1.2 | 1.2 | 1.2 | 1.2 | 2.4 | 0.0 | −3.6 | 15.0 | 7.5 | 3.6 |
| 59 | H | 1180 | 1.6 | 1.6 | 1.6 | 1.6 | 3.2 | 0.0 | −4.8 | 15.0 | 7.5 | 4.8 |
| 60 | G | 1180 | 2.0 | 2.0 | 2.0 | 2.0 | 4.0 | 0.0 | −6.0 | 15.0 | 7.5 | 6.0 |
| 61 | A | 980 | 1.2 | 1.2 | 1.2 | 1.2 | 2.4 | 0.2 | −3.6 | 15.0 | 7.5 | 3.6 |
| 62 | D | 980 | 1.6 | 1.6 | 1.6 | 1.6 | 3.2 | 0.3 | −4.8 | 15.0 | 7.5 | 4.8 |
| 63 | C | 980 | 2.0 | 2.0 | 2.0 | 2.0 | 4.0 | 0.4 | −6.0 | 15.0 | 7.5 | 6.0 |
| 64 | E | 1180 | 1.2 | 1.2 | 1.2 | 1.2 | 2.4 | 0.2 | −3.6 | 15.0 | 7.5 | 3.6 |
| 65 | H | 1180 | 1.6 | 1.6 | 1.6 | 1.6 | 3.2 | 0.3 | −4.8 | 15.0 | 7.5 | 4.8 |
| 66 | G | 1180 | 2.0 | 2.0 | 2.0 | 2.0 | 4.0 | 0.4 | −6.0 | 15.0 | 7.5 | 6.0 |
| 67 | A | 980 | 1.2 | 1.2 | 1.2 | 1.2 | 2.4 | 0.2 | −3.6 | 15.0 | 10.0 | 3.6 |
| 68 | D | 980 | 1.6 | 1.6 | 1.6 | 1.6 | 3.2 | 0.3 | −4.8 | 15.0 | 10.0 | 4.8 |
| 69 | C | 980 | 2.0 | 2.0 | 2.0 | 2.0 | 4.0 | 0.4 | −6.0 | 15.0 | 10.0 | 6.0 |
| 70 | E | 1180 | 1.2 | 1.2 | 1.2 | 1.2 | 2.4 | 0.2 | −3.6 | 15.0 | 10.0 | 3.6 |
| 71 | H | 1180 | 1.6 | 1.6 | 1.6 | 1.6 | 3.2 | 0.3 | −4.8 | 15.0 | 10.0 | 4.8 |
| 72 | G | 1180 | 2.0 | 2.0 | 2.0 | 2.0 | 4.0 | 0.4 | −6.0 | 15.0 | 10.0 | 6.0 |
| 73 | A | 980 | 1.2 | 1.2 | 1.2 | 1.2 | 2.4 | 0.2 | −3.6 | 15.0 | 8.0 | 3.6 |

| Test No. | Main welding step Speed vi (m/min) | Main welding step Focal position fi (mm) | Final welding step Power Pf (kW) | Final welding step Speed vf (m/min) | Final welding step Focal position ff (mm) | Shape of crater Length lc (mm) | Shape of crater Depth dc (mm) | Shape of crater Width wc (mm) | Evaluation Weld cracking | Evaluation Peeling strength (kN) | Remarks |
|---|---|---|---|---|---|---|---|---|---|---|---|
| 37 | 3.0 | 0.0 | 1.5 | 1.5 | 10.0 | 2.91 | 0.83 | 1.25 | Yes | 1.63 | Comparative Example |
| 38 | 3.0 | 0.0 | 6.0 | 1.5 | 10.0 | 2.84 | 1.29 | 1.28 | Yes | 1.50 | Comparative Example |
| 39 | 3.0 | 0.0 | 1.5 | 3.0 | 10.0 | 4.99 | 0.87 | 1.22 | Yes | 1.46 | Comparative Example |
| 40 | 3.0 | 0.0 | 1.5 | 1.5 | 0.0 | 3.10 | 0.93 | 0.93 | Yes | 1.73 | Comparative Example |
| 41 | 3.0 | 0.0 | 1.5 | 1.5 | 10.0 | 2.96 | 0.82 | 1.21 | No | 1.44 | Inventive Example |
| 42 | 3.0 | 0.0 | 1.5 | 1.5 | 10.0 | 2.79 | 1.39 | 1.18 | Yes | 0.83 | Comparative Example |
| 44 | 3.0 | 0.0 | 1.5 | 1.5 | 10.0 | 3.17 | 0.85 | 1.23 | Yes | 0.55 | Comparative Example |
| 45 | 3.0 | 0.0 | 1.5 | 1.5 | 10.0 | 2.97 | 0.82 | 1.24 | Yes | 1.33 | Comparative Example |

TABLE 2-2-continued

| | | | | | | | | | | |
|---|---|---|---|---|---|---|---|---|---|---|
| 46 | 3.0 | 0.0 | 6.0 | 1.5 | 10.0 | 2.88 | 1.30 | 1.24 | Yes | 1.37 | Comparative Example |
| 47 | 3.0 | 0.0 | 1.5 | 3.0 | 10.0 | 4.78 | 0.85 | 1.17 | Yes | 1.83 | Comparative Example |
| 48 | 3.0 | 0.0 | 1.5 | 1.5 | 0.0 | 3.01 | 0.89 | 0.82 | No | 1.36 | Comparative Example |
| 49 | 3.0 | 0.0 | 0.9 | 1.5 | 10.0 | 2.89 | 0.58 | 0.86 | No | 4.73 | Inventive Example |
| 50 | 3.0 | 0.0 | 1.2 | 1.5 | 10.0 | 3.30 | 0.67 | 0.99 | No | 4.36 | Inventive Example |
| 51 | 3.0 | 0.0 | 1.5 | 1.5 | 10.0 | 3.72 | 0.86 | 1.24 | No | 5.21 | Inventive Example |
| 52 | 3.0 | 0.0 | 0.9 | 1.5 | 10.0 | 2.84 | 0.53 | 0.72 | No | 4.13 | Inventive Example |
| 53 | 3.0 | 0.0 | 1.2 | 1.5 | 10.0 | 3.21 | 0.76 | 1.18 | No | 3.98 | Inventive Example |
| 54 | 3.0 | 0.0 | 1.5 | 1.5 | 10.0 | 3.56 | 0.88 | 1.34 | No | 4.72 | Inventive Example |
| 55 | 3.0 | 0.0 | 0.9 | 1.5 | 10.0 | 3.20 | 0.32 | 0.78 | No | 1.42 | Inventive Example |
| 56 | 3.0 | 0.0 | 1.2 | 1.5 | 10.0 | 2.93 | 0.24 | 1.12 | No | 1.56 | Inventive Example |
| 57 | 3.0 | 0.0 | 1.5 | 1.5 | 10.0 | 2.84 | 0.41 | 1.36 | No | 1.25 | Inventive Example |
| 58 | 3.0 | 0.0 | 0.9 | 1.5 | 10.0 | 3.14 | 0.25 | 0.56 | No | 1.34 | Inventive Example |
| 59 | 3.0 | 0.0 | 1.2 | 1.5 | 10.0 | 2.99 | 0.28 | 1.03 | No | 1.42 | Inventive Example |
| 60 | 3.0 | 0.0 | 1.5 | 1.5 | 10.0 | 2.80 | 0.43 | 1.31 | No | 1.63 | Inventive Example |
| 61 | 3.0 | 0.0 | 1.8 | 0.8 | 20.0 | 3.16 | 0.55 | 0.93 | No | 1.63 | Inventive Example |
| 62 | 3.0 | 0.0 | 2.4 | 0.8 | 20.0 | 2.94 | 0.53 | 1.20 | No | 1.29 | Inventive Example |
| 63 | 3.0 | 0.0 | 3.0 | 0.8 | 20.0 | 3.05 | 0.92 | 1.67 | No | 1.53 | Inventive Example |
| 64 | 3.0 | 0.0 | 1.8 | 0.8 | 20.0 | 2.79 | 0.43 | 1.00 | No | 1.38 | Inventive Example |
| 65 | 3.0 | 0.0 | 2.4 | 0.8 | 20.0 | 2.82 | 0.67 | 1.18 | No | 1.58 | Inventive Example |
| 66 | 3.0 | 0.0 | 3.0 | 0.8 | 20.0 | 3.42 | 0.82 | 1.53 | No | 1.53 | Inventive Example |
| 67 | 3.0 | 0.0 | 1.8 | 0.8 | 20.0 | 3.13 | 0.53 | 0.89 | No | 1.21 | Inventive Example |
| 68 | 3.0 | 0.0 | 2.4 | 0.8 | 20.0 | 3.01 | 0.45 | 1.53 | No | 1.29 | Inventive Example |
| 69 | 3.0 | 0.0 | 3.0 | 0.8 | 20.0 | 2.89 | 0.60 | 1.83 | No | 1.25 | Inventive Example |
| 70 | 3.0 | 0.0 | 1.8 | 0.8 | 20.0 | 3.27 | 0.46 | 0.93 | No | 1.22 | Inventive Example |
| 71 | 3.0 | 0.0 | 2.4 | 0.8 | 20.0 | 2.82 | 0.52 | 1.39 | No | 1.30 | Inventive Example |
| 72 | 3.0 | 0.0 | 3.0 | 0.8 | 20.0 | 3.36 | 0.64 | 1.78 | No | 1.23 | Inventive Example |
| 73 | 3.0 | 0.0 | 1.8 | 0.8 | 20.0 | 3.02 | 0.51 | 1.61 | No | 1.25 | Inventive Example |

As can be seen from Tables 2-1 and 2-2, the peeling strength of each of the test pieces in the Inventive Examples was 1.2 kN or more, and no weld defects occurred.

In test pieces Nos. 2, 10, 18, 26, 34, and 42 in Comparative Examples, the total sheet gap G was larger than 15% of the total thickness T, and the depth $d_c$ of the crater 5 in the terminal end point E of the weld zone 4 was large (the value was large), so that weld cracking occurred.

In Nos. 4, 12, 20, 28, 36, and 44, the full length L of the weld zone 4 was shorter than 15.0 mm, so that weld cracking occurred.

In Nos. 5, 13, 21, 29, 37, and 45, the length L2 of the final weld zone 4b was small, so that weld cracking occurred.

In Nos. 6, 14, 22, 30, 38, and 46, the depth $d_c$ of the crater 5 in the terminal end point E of the weld zone 4 was large (the value was large), so that weld cracking occurred.

In Nos. 7, 15, 23, 31, 39, and 47, the length $l_c$ of the crater 5 in the terminal end point E of the weld zone 4 was large, so that weld cracking occurred.

In Nos. 8, 16, 24, 32, 40, and 48, the width $w_c$ of the crater 5 in the terminal end point E of the weld zone 4 was small, so that weld cracking occurred.

As described above, in each of the Inventive Examples in which the laser lap welding was performed according to aspects of the present invention described above, a good laser-welded lap joint having the target characteristics according to aspects of the present invention was obtained. However, in each of the Comparative Examples not satisfying the welding conditions according to aspects of the present invention, a good laser-welded lap joint was not obtained.

REFERENCE SIGNS LIST

1 laser-welded lap joint
2 steel sheet
3 steel sheet
4 weld zone
4a main weld zone
4b final weld zone
5 crater
7 laser beam
8 steel sheet
14 weld zone
15 crater
16 crack
L full length of weld zone
L2 length of final weld zone
$l_c$ length of crater
$d_c$ depth of crater
$w_c$ width of crater
W width of weld zone
G sheet gap

The invention claimed is:

1. A laser-welded lap joint comprising a weld zone formed by laser welding in a lapped portion including a plurality of steel sheets lapped one over another,
wherein the weld zone includes a main weld zone that penetrates the steel sheets in the lapped portion and a final weld zone formed at one end of the main weld zone and having a crater, and
wherein the weld zone satisfies formulas (1) to (4):

$$L \geq 15.0; \tag{1}$$

$$10.0 \geq L2 \geq 2l_c; \tag{2}$$

$$t1 \geq 2d_c; \tag{3}$$

$$w_c > d_c, \tag{4}$$

where L is the full length (unit: mm) of the weld zone, L2 is the length (unit: mm) of the final weld zone, $l_c$ is the length (unit: mm) of the crater in the final weld zone, t1 is the thickness (unit: mm) of an uppermost steel sheet in the lapped portion, $d_c$ is the depth (unit: mm) of the crater in the final weld zone, and $w_c$ is the width (unit: mm) of the crater in the final weld zone.

2. The laser-welded lap joint according to claim 1, wherein the total size of a gap between the steel sheets in the lapped portion is 0% or more and 15% or less of the total thickness of the plurality of steel sheets.

3. The laser-welded lap joint according to claim 2, wherein at least one steel sheet of the plurality of steel sheets has a chemical composition comprising, in mass %:
C: more than 0.07% and 0.25% or less;
P+S: less than 0.03%;
Mn: 1.8% or more and 3.0% or less; and
Si: more than 1.2% and 2.5% or less,
with the balance being Fe and unavoidable impurities.

4. The laser-welded lap joint according to claim 3, further comprising, in addition to the chemical composition, one or two selected from the following groups A and B:
group A: in mass %, one or two selected from Ti: 0.005% or more and 0.01% or less and Nb: 0.005% or more and less than 0.050%, and
group B: in mass %, one or two or more selected from Cr: 1.0% or less, Mo: 0.50% or less, and B: 0.10% or less.

5. The laser-welded lap joint according to claim 4, wherein at least one steel sheet of the plurality of steel sheets is a high-tensile steel sheet with a tensile strength of 980 MPa or more.

6. The laser-welded lap joint according to claim 3, wherein at least one steel sheet of the plurality of steel sheets is a high-tensile steel sheet with a tensile strength of 980 MPa or more.

7. The laser-welded lap joint according to claim 2, wherein at least one steel sheet of the plurality of steel sheets is a high-tensile steel sheet with a tensile strength of 980 MPa or more.

8. A method for producing the laser-welded lap joint according to claim 2, the method comprising:
lapping the plurality of steel sheets vertically one over another; and
performing laser welding in which a surface of the uppermost steel sheet in the lapped portion including the plurality of lapped steel sheets is irradiated with a laser beam to form the weld zone in the lapped portion to thereby join the plurality of lapped steel sheets together.

9. The method for producing the laser-welded lap joint according to claim 8, wherein the laser welding includes: a main welding step of forming the main weld zone;
and a final welding step of forming the final weld zone having the crater, and wherein at least one of laser power, welding speed, a focal position, and a beam diameter in the final welding step is controlled under conditions that formula (5) to (7) are satisfied such that the weld zone formed satisfies formulas (1) to (4):

$$L \geq 15.0; \tag{1}$$

$$10.0 \geq L2 \geq 2l_c; \tag{2}$$

$$t1 \geq 2d_c; \tag{3}$$

$$w_c > d_c, \tag{4}$$

$$P_i \geq P_f \geq (1/4)P_i; \tag{5}$$

$$v_i \geq v_f \geq (1/4)v_i; \tag{6}$$

$$f_i \leq f_f \leq 20.0, \tag{7}$$

where L is the full length (unit: mm) of the weld zone, L2 is the length (unit: mm) of the final weld zone, $l_c$ is the length (unit: mm) of the crater in the final weld zone, t1 is the thickness (unit: mm) of the uppermost steel sheet in the lapped portion, $d_c$ is the depth (unit: mm) of the crater in the final weld zone, $w_c$ is the width (unit: mm) of the crater in the final weld zone, $P_i$ is laser power (unit: kW) in the main welding step, $P_f$ is the laser power (unit: kW) in the final welding step, $v_i$ is welding speed (unit: m/min) in the main welding step, $v_f$ is the welding speed (unit: m/min) in the final welding step, $f_i$ is a focal position (unit: mm) in the main welding step, and $f_f$ is the focal position (unit: mm) in the final welding step.

10. An automobile frame component comprising the laser-welded lap joint according to claim 2.

11. The laser-welded lap joint according to claim 1, wherein at least one steel sheet of the plurality of steel sheets has a chemical composition comprising, in mass %:
C: more than 0.07% and 0.25% or less;
P+S: less than 0.03%;
Mn: 1.8% or more and 3.0% or less; and
Si: more than 1.2% and 2.5% or less,
with the balance being Fe and unavoidable impurities.

12. The laser-welded lap joint according to claim 11, further comprising, in addition to the chemical composition, one or two selected from the following groups A and B:
group A: in mass %, one or two selected from Ti: 0.005% or more and 0.01% or less and Nb: 0.005% or more and less than 0.050%, and
group B: in mass %, one or two or more selected from Cr: 1.0% or less, Mo: 0.50% or less, and B: 0.10% or less.

13. The laser-welded lap joint according to claim 12, wherein at least one steel sheet of the plurality of steel sheets is a high-tensile steel sheet with a tensile strength of 980 MPa or more.

14. The laser-welded lap joint according to claim 11, wherein at least one steel sheet of the plurality of steel sheets is a high-tensile steel sheet with a tensile strength of 980 MPa or more.

15. The laser-welded lap joint according to claim 1, wherein at least one steel sheet of the plurality of steel sheets is a high-tensile steel sheet with a tensile strength of 980 MPa or more.

16. A method for producing the laser-welded lap joint according to claim 1, the method comprising:
lapping the plurality of steel sheets vertically one over another; and
performing laser welding in which a surface of the uppermost steel sheet in the lapped portion including the plurality of lapped steel sheets is irradiated with a laser beam to form the weld zone in the lapped portion to thereby join the plurality of lapped steel sheets together.

17. The method for producing the laser-welded lap joint according to claim 16, wherein the laser welding includes: a main welding step of forming the main weld zone; and a final welding step of forming the final weld zone having the crater, and
wherein at least one of laser power, welding speed, a focal position, and a beam diameter in the final welding step is controlled under conditions that formula (5) to (7) are satisfied such that the weld zone formed satisfies formulas (1) to (4):

$$L \geq 15.0; \tag{1}$$

$$10.0 \geq L2 \geq 2l_c; \tag{2}$$

$$t1 \geq 2d_c; \tag{3}$$

$$w_c > d_c, \tag{4}$$

$$P_i \geq P_f \geq (1/4)P_i; \tag{5}$$

$$v_i \geq v_f \geq (1/4)v_i; \quad (6)$$

$$f_i \leq f_f \leq 20.0, \quad (7)$$

where L is the full length (unit: mm) of the weld zone, L2 is the length (unit: mm) of the final weld zone, $l_c$ is the length (unit: mm) of the crater in the final weld zone, t1 is the thickness (unit: mm) of the uppermost steel sheet in the lapped portion, $d_c$ is the depth (unit: mm) of the crater in the final weld zone, $w_c$ is the width (unit: mm) of the crater in the final weld zone, $P_i$ is laser power (unit: kW) in the main welding step, $P_f$ is the laser power (unit: kW) in the final welding step, $v_i$ is welding speed (unit: m/min) in the main welding step, $v_f$ is the welding speed (unit: m/min) in the final welding step, $f_i$ is a focal position (unit: mm) in the main welding step, and $f_f$ is the focal position (unit: mm) in the final welding step.

18. An automobile frame component comprising the laser-welded lap joint according to claim 1.

\* \* \* \* \*